US012101857B2

(12) United States Patent
Ehrhardt

(10) Patent No.: US 12,101,857 B2
(45) Date of Patent: Sep. 24, 2024

(54) LIGHT SOURCE DRIVER CIRCUIT, OPTICAL MEASURING DEVICE COMPRISING THE LIGHT SOURCE DRIVER CIRCUIT, DEVICE FOR CHECKING VALUE DOCUMENTS, AND METHOD FOR OPERATING A LIGHT SOURCE LOAD BY MEANS OF THE LIGHT SOURCE DRIVER CIRCUIT

(71) Applicant: GIESECKE+DEVRIENT CURRENCY TECHNOLOGY GMBH, Munich (DE)

(72) Inventor: Ulf Ehrhardt, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 416 days.

(21) Appl. No.: 17/627,511

(22) PCT Filed: Jul. 13, 2020

(86) PCT No.: PCT/EP2020/025330
§ 371 (c)(1),
(2) Date: Jan. 14, 2022

(87) PCT Pub. No.: WO2021/008732
PCT Pub. Date: Jan. 21, 2021

(65) Prior Publication Data

US 2022/0264720 A1 Aug. 18, 2022

(30) Foreign Application Priority Data

Jul. 18, 2019 (DE) .................... 10 2019 005 029.0

(51) Int. Cl.
*H05B 45/325* (2020.01)
*G07D 7/121* (2016.01)
*H05B 45/375* (2020.01)

(52) U.S. Cl.
CPC .......... *H05B 45/325* (2020.01); *G07D 7/121* (2013.01); *H05B 45/375* (2020.01)

(58) Field of Classification Search
None
See application file for complete search history.

(56) References Cited

U.S. PATENT DOCUMENTS 5,280,333 A 1/1994 Wunderer
9,078,320 B2 7/2015 Wiegele et al.
(Continued)

FOREIGN PATENT DOCUMENTS

DE 102010015088 A1 9/2011
DE 102011107089 A1 1/2013
(Continued)

OTHER PUBLICATIONS

International Search Report with Written Opinion from PCT Application No. PCT/EP2020/025330, Nov. 11, 2020.
(Continued)

*Primary Examiner* — Anh Q Tran
(74) *Attorney, Agent, or Firm* — Workman Nydegger

(57) ABSTRACT

A light source driver circuit has a switching regulator including a voltage input, a voltage output, and a regulation input; a current source with a switching element and a voltage-controllable member arranged in series with the light source load. A pulse signal is applied to a control terminal of the switching element to connect, in a first switching state of the switching element, a control terminal of the voltage-controllable member to a voltage source and in a second switching state of the switching element not to (Continued)

connect the control terminal of the voltage-controllable member to the voltage source; and a regulation unit. An optical measuring instrument includes a light source driver circuit, a device checks value documents with the light source driver circuit, and a method is provided for operating a light source load with the light source driver circuit.

15 Claims, 14 Drawing Sheets

(56) References Cited

U.S. PATENT DOCUMENTS

| | | | | |
|---|---|---|---|---|
| 2008/0170012 | A1* | 7/2008 | S | G09G 3/3413 345/82 |
| 2009/0167197 | A1 | 7/2009 | Wang et al. | |
| 2009/0187925 | A1 | 7/2009 | Hu et al. | |
| 2011/0156605 | A1 | 6/2011 | Ku et al. | |
| 2013/0009556 | A1* | 1/2013 | Szczeszynski | H03K 7/08 323/283 |
| 2014/0232271 | A1 | 8/2014 | Wiegele et al. | |

FOREIGN PATENT DOCUMENTS

| | | | |
|---|---|---|---|
| DE | 102011112455 | A1 | 3/2013 |
| EP | 0466119 | A2 * | 7/1991 |
| EP | 2054873 | A2 | 5/2009 |
| KR | 1020090060878 | A | 6/2009 |
| KR | 101028860 | B1 | 4/2011 |

OTHER PUBLICATIONS

German Search Report from corresponding DE Application No. 102019005029.0, Apr. 22, 2020.

"LM3464, LM3464A, LED Driver with Dynamic Headroom Control and Thermal Control Interfaces," Texas Instruments Inc., Dallas, Texas, May 31, 2013, http://www.ti.com accessed on Jan. 12, 2022.

* cited by examiner

100

LIGHT SOURCE DRIVER CIRCUIT, OPTICAL MEASURING DEVICE COMPRISING THE LIGHT SOURCE DRIVER CIRCUIT, DEVICE FOR CHECKING VALUE DOCUMENTS, AND METHOD FOR OPERATING A LIGHT SOURCE LOAD BY MEANS OF THE LIGHT SOURCE DRIVER CIRCUIT

BACKGROUND

The invention relates to a light source driver circuit, an optical measuring instrument having the light source driver circuit, a device for checking value documents with the light source driver circuit, and a method for operating a light source load with the light source driver circuit.

The light source driver circuit or the optical measuring instrument are, for example, a system component in a bank note processing machine for feature recognition of machine-readable features. For example, machine-readable features are used for papers of value, such as bank notes, passports or identity cards—hereinafter referred to simply as objects to be measured—in order to be able to prove the authenticity of the object to be measured. Here, the object to be measured is irradiated by means of fast-switched and high-luminous light flashes, and a characteristic response of the object to be measured to these light flashes is evaluated. With such a method, forgeries of the objects to be measured can be reliably recognized.

A device according to the invention for checking value documents is to check a large number of objects to be measured in the shortest possible time. Here, in bank note processing machines, transport and processing speeds of several metres per second, in particular between 1 and 12 m/s, are desired. These processing speeds for checking an object to be measured, which is then subjected to several light flashes, make high demands on the generation of the light flashes.

The illumination of the objects to be measured that are to be checked is effected by means of at least one light source, in particular an LED. When operating light source loads, light source driver circuits with switching regulators are usually used. Here, a general goal is to operate a light source load with low current ripple and to lower a voltage required for triggering a light source load in order to reduce unnecessary power dissipation.

KR 2009 0060878 A and KR 10 102 88 60 B1 each propose LED driver circuits for illumination applications. In circuit variants, pulse width modulation (PWM) operations of the LED driver circuits are presented for enabling efficient brightness regulation with unchanged LED current and constant LED wavelength. None of the circuits is suitable for generating alternating pulse current values of the LED load.

None of the circuits without PWM operating mode can deliver the pulse current value of the LED load of the circuit's steady state immediately after switching on, i.e. applying the operating voltage. None of the circuits with PWM operating mode can deliver the pulse current value of the LED load of the circuit's steady state immediately after applying the PWM control pulses.

US 2009/0187925 A1 describes an LED driver circuit that supplies a constant current to all LEDs connected in series and ensures uniform lighting and optimum operating efficiency at low cost over a wide region of input/output voltage and temperature. Short-term changes in the LED branch voltage, as they would for example be provided in a pulsed current operation, would lead to a change in the LED current. Therefore, this circuit is not suitable for a pulsed operation.

In addition, data sheets for LED driver circuits are known, for example the LM3464 circuit of Texas Instruments or the ZXLD1362 circuit of Zetex Semiconductors. Although these solutions disclose a minimization of a voltage drop of the drain-source voltage of a MOSFET for minimizing a power consumption, none of the solutions shown is suitable for a pulsed operation of the LED load, in particular when varying pulse sequences, for example alternating pulse heights, are employed, in order to capture properties of an object to be measured by means of emitting light through the LED driver circuit of an optical measuring instrument or of a device for checking value documents.

SUMMARY

The invention is based on the object of implementing a highly efficient operation of a light source load, in particular an LED load, in which a variation of the voltage of a switching regulator is corrected. In this regard, various light source loads should be operable. The number and type of light sources to be operated should not be limiting. In addition, nominally different forward voltages of the light sources and fluctuations of the forward voltages during operation are to be compensated for in an energy-efficient manner. For example, an aging of an LED load or a heating of an LED load or the application of fast, even cyclically varying, pulse sequences—as required, for example, in a device for checking value documents—should have no influence on the power consumption of the light source driver. A cyclically varying pulse sequence here is a sequence of current pulses, which in particular can have various pulse lengths, pulse pauses and current intensities, which is repeated at fixed time intervals.

According to the invention, a light source driver circuit is proposed. The light source driver circuit has a switching regulator with a voltage input for applying an input voltage, a voltage output for outputting an output voltage to be regulated for operating a light source load, and a regulation input for applying a regulating voltage for regulating the voltage amount of the output voltage.

As a light source load at least one light source to be operated is provided. Preferably, as a light source load there is provided an LED, also called a light emitting diode, or the interconnection of a plurality of LEDs that are connected in series or in parallel with each other. A parallel connection of several series connections of LEDs (LED branches) is also conceivable. In a further preferred embodiment, the light source load comprises at least one other semiconductor light source based on the same working principle, such as a laser diode, a resonant cavity light emitting diode, RC-LED for short, or an organic light emitting diode, OLED for short. Other loads, for example incandescent lamps, motors or thermoelectric elements, can also be advantageously operated with the current driver according to the invention.

A switching regulator is a voltage regulator as a basis for an efficient voltage supply to a load, in this case the light source load, with the aid of a periodically switched on electronic switching element and at least one energy storage, for example a capacitive energy storage and/or inductive energy storage. The switching regulator may have a rectification unit.

The switching regulator regulates an input voltage applied (fed) to the voltage input of the switching regulator, for example an input alternating voltage or an input direct voltage into an output direct voltage, also referred to as output voltage, outputtable (tappable, available) at the voltage output of the switching regulator. The output direct voltage preferably has a higher, lower or inverted voltage level compared to the input voltage.

As a switching regulator for example a direct voltage regulator, also referred to as a DC-DC regulator or DC chopper, is used, which regulates an input direct voltage fed at the voltage input of the switching regulator into an output direct voltage outputtable at the voltage output of the switching regulator with a higher (buck-boost converter), lower (buck converter) or inverted voltage level.

Preferably, a buck converter is used as a switching regulator. A buck converter, also referred to as a step-down converter, regulates an input voltage fed at the voltage input of the switching regulator into an output voltage made available at the voltage output of the switching regulator with a lower voltage level—compared to the input voltage fed.

The switching regulator comprises a regulation input for applying (feeding) a regulating voltage. This regulating voltage sets the voltage level of the switching regulator's output voltage to be output. The voltage level of the output voltage is therefore dependent on the regulating voltage (=affinity). The voltage level of the regulating voltage is injective, preferably injectively monotonically increasing/decreasing and in a special case bijectively mappable to the output voltage. Thus, a change in the regulating voltage by means of the switching regulator is clearly turned into a change in the output voltage. This dependence is preferably linear or logarithmic. A drop in the output voltage is only possible when the energy storage of the switching regulator is discharged, i.e. a current flows from the switching regulator.

Preferably, the output voltage tappable at the voltage output of the switching regulator changes linearly with the regulating voltage made available at the regulation input. The slope of this linear function is referred to as the proportionality factor. Particularly preferably, the proportionality factor is negative, so that the output voltage diminishes when the regulating voltage increases. This enables a particularly simple triggering of the switching regulator.

The light source driver circuit according to the invention additionally has a current source with a switching element and a voltage-controllable member arranged in series with the light source load, a pulse signal being applied to a control terminal of the switching element, in a pulse phase of the pulse signal the switching element being switched into a first switching state in which a control terminal of the voltage-controllable member is connected to a voltage source, and in a pulse pause of the pulse signal the switching element being switched into a second switching state in which the control terminal of the voltage-controllable member is not connected to the voltage source.

In a preferred embodiment, in the second switching state of the switching element, the control terminal of the voltage-controllable member is connected to a reference potential, so that possibly present charges flow out of the voltage-controllable member.

The use of the term "current source" instead of the equally usable term "current sink" for this component of the light source driver circuit is arbitrary. It should be noted that the choice of the respective term is merely defined by a current direction at the output of the current source/current sink. Thus, in the case of a current source, an output current is delivered, whereas in the case of an inverse definition of the current direction the same component would be referred to as a current sink. Since the current source used here is operated in series with the light source load, the choice of the term "current source" or "current sink" depends merely on an actual position of the light source load in relation to the current source/current sink. Since the actual position is not limiting according to the invention, the term current source can be used synonymously with the term current sink. In this application, the term current source is used for this component of the light source driver circuit.

A current source is an active two-pole in the light source driver circuit, which at its connection point delivers an electric current to the light source load. Here, the current intensity of the delivered current depends only slightly, or ideally not at all, on the electrical voltage at its connection point, so that the electrical current is almost independent of the connected light source load (the connected consumer). For example, the current changes by only 0.1% with a voltage change of 1 V. The current source is connected in series with the light source load so that the delivered current of the current source is the current through the light source load.

The power source comprises a switching element, for example an electronic switch or an electromechanical switch or a mechanical switch. Preferably, an electronic switch, e.g. a semiconductor switch, is employed. The switching element is switched from a first switching state (for example closed) to a second switching state (for example open) by means of a pulse signal at its control terminal. In a pulse phase of the pulse signal, the switching element is switched to a first switching state. In a pulse pause of the pulse signal, the switching element is switched to a second switching state. In the first switching state of the switching element of the current source the current source is switched to be active, and in the second switching state of the pulse signal the current source is switched to be inactive. The pulse signal, preferably a binary switching signal, is applied to a control terminal of the switching element (for example a gate terminal of a switching transistor). The pulse signal is, for example, an output signal of a microcontroller connected to the control terminal of the switching element.

A switching element of the switching regulator is different from the switching element of the current source and is operated independently of the switching element of the current source by means of a pulse signal which is generated in the switching regulator itself In addition to the switching element, the current source also comprises a voltage-controllable member, preferably a field-effect transistor, or FET for short. The switching element of the current source, with a first terminal, is connected to a control terminal of the voltage-controllable member. In the first switching state of the switching element, the control terminal of the voltage-controllable member is connected to a voltage source, in this first switching state (closed) the current source delivers electric current. Thus, in the first switching state the voltage-controllable member makes available an output current of the current source. Here, the voltage level of the voltage source sets the current level of the output current of the current source. In the second switching state of the switching element, the control terminal of the voltage-controllable member is not connected to the voltage source, in this second switching state (open) the current source does not deliver any output current.

The voltage-controllable member, with a first terminal, is connected to a terminal of the light source load. The output current of the current source thus flows through the light source load. That is, the output current, which is set by the voltage level at the control terminal of the voltage-controllable member in the pulse phase of the pulse signal and is made available by the voltage-controllable member, in the first switching state of the switching element also flows through the light source load, whereby the light source load emits light. This also means that in the second switching state of the switching element, no output current is made available by the current source, and thus no current flows through the light source load, whereby the light source load does not emit light in the second switching state.

In addition, the light source driver circuit has a regulation unit, the first input thereof being connected to a first terminal of the voltage-controllable member of the power source and the second input thereof being connected to a second terminal of the voltage-controllable member of the power source in order to tap a voltage drop across the voltage-controllable member in the first switching state (closed). The output of the regulation unit is connected to the regulation input of the switching regulator in order to apply (make available) the regulating voltage to the switching regulator.

The regulating voltage is regulated by means of the regulation unit in dependence on the voltage drop in the first switching state (closed) at the voltage-controllable member. This regulation of the regulating voltage by means of the regulation unit is effected in such a way that the voltage drop across the voltage-controllable member is minimal.

By means of the regulation unit according to the invention, the output voltage of the switching regulator is regulated to have a value which is equal to the sum of the voltage drop across the light source load plus the desired minimum voltage drop across the voltage-controllable member.

If the current source has a current measuring resistor (shunt) in series with the light source load and the voltage-controllable member, the outputted output voltage of the switching regulator is regulated to have a value which is equal to the sum of the voltage drop across the light source load plus the desired minimum voltage drop across the voltage-controllable member plus the voltage drop across the current measuring resistor.

By regulating the voltage drop across the voltage-controllable member to a minimum, the energy dissipated in the voltage-controllable member is reduced to a minimum and thus an energy consumption of the light source driver circuit is reduced.

In addition, a variation in the output voltage of the switching regulator is compensated. This compensation enables, for example, for a given light source driver circuit a variation of both the number of light sources and their interconnection (in series or parallel). Nominally different light source forward voltages and fluctuations of the light source forward voltages during operation of the light source driver circuit due to aging or circuit-internal or circuit-external temperature fluctuations (heating/cooling) are also compensated for in an energy-efficient manner.

The pulse signal at the control terminal of the switching element of the current source is also referred to as a pulse sequence. The pulse signal is a periodically repeating change of the voltage level at the control terminal of the switching element of the current source, where as a result in a pulse phase (first switching state) a current flows through the voltage-controllable member and in a pulse pause (second switching state) no current flows through the voltage-controllable member. By this cyclic alternation of the switching state the control terminal of the voltage-controllable member is connected or disconnected to the voltage source corresponding to the pulse signal, thereby the current source being periodically switched on and off. The current source delivers a pulsed current for the light source load when the pulse signal is applied. This pulse signal leads to cyclic pulse currents and as a result to the periodic (cyclic) switching on or off of the light source load. The current through the light source load during the pulse pause is preferably 0 A.

The pulse signal consists of a sequence of at least two single pulses. Each single pulse comprises a single pulse phase (e.g. voltage at "HIGH" level) and a single pulse pause (e.g. voltage at "LOW" level). A single pulse phase and a single pulse pause result in a single pulse period duration. Preferably, the single pulse period durations of the at least two single pulses are of equal length, i.e. the single pulses have a fixed frequency. This frequency is preferably between 100 Hz and 50 kHz (corresponding to a single pulse period duration between 20 μs and 10 ms). When employing the light source driver circuit in a device for checking bank notes, these frequencies enable a locally resolved check of moving bank notes at typical processing speeds between 1 and 12 m/s.

The pulse signal can be a so-called burst signal. The burst signal consists of at least one burst consisting of a limited number of single pulses. The sum of all single pulse period durations of a burst results in one burst phase. Preferably, a burst consists of 5 to 50 single pulses. When employing the light source driver circuit in a device for checking bank notes, this enables a locally resolved check of a moving bank note, the light source being switched on only when the bank note is present in the measuring region.

The burst signal can be a periodically recurring signal. The time period between two consecutive bursts is the burst pause. One burst phase and one burst pause result in a burst period duration. The burst period duration is preferably between 10 ms and 1 s. When employing the light source driver circuit in a device for checking bank notes, there thus results one burst per bank note at typical processing speeds between 1 and 12 m/s.

In this regard, the pulse signal for switching the switching element can be a pulse width modulated signal, so that a duty ratio of the pulse signal is variable. The duty ratio indicates the ratio of the pulse phase to the pulse period duration for the periodic sequence of pulses.

In a preferred embodiment, the regulation unit comprises a storage capacitor for increasing and decreasing a voltage amount of the regulating voltage. To increase the regulating voltage, a charge is introduced into the storage capacitor. To decrease the regulating voltage, a charge is taken from the storage capacitor. The storage capacitor is therefore a dynamic charge storage. The resulting average voltage across the storage capacitor is applied as the regulating voltage to the regulation input of the switching regulator. This allows compensation for variations in the voltage drop across the light source load and for variations in the output voltage of the switching regulator. Here, by the voltage drop across the voltage-controllable member in the first switching state (closed) the voltage-controllable member is operated at the optimum operating point with a minimum voltage drop in the first switching state (closed).

Here, the storage capacitor is part of a linear, time-invariant system in the regulation unit. Preferably, the storage capacitor is a part of two resistor-capacitor elements, RC elements for short, in order to create two integrating, time-continuous, linear, time-invariant transmission elements in the regulation unit that are easy to implement.

The time constant of the RC element for charging the storage capacitor must assume such a value that the highest rate of change of the storage capacitor voltage is smaller, preferably 2 times smaller, than the quotient of the lowest rate of change of the switching regulator output voltage and the switching regulator proportionality factor. The rate of change of the storage capacitor voltage can also be even smaller, but would then unnecessarily prolong the adjustment phase. The rate of change of the switching regulator output voltage is the quotient of the smallest light source load current in the pulse phase and the capacitance of the energy storage at the output of the switching regulator. The dimensioning condition for the time constant ensures that no undershoot of the switching regulator output voltage occurs at the end of the adjustment phase, which can lead to a too low voltage drop across the voltage-controllable member, which can subsequently lead to an undesired reduction of the light source current.

In a preferred embodiment, the following values are specified:

lowest rate of change of the switching regulator output voltage dUSRA1/dt=165 V/s switching regulator proportionality factor KS=5.5 rate of change of the storage capacitor voltage dUSK1/dt=dUSRA1/dt/$K_S$/2=15 V/s charging voltage of the RC element UL=5 V time constant of the RC element τ (charging)=UL/dUSK1/dt=0.3 s A flowing-off of charges from the storage capacitor in pulse pauses is necessary so that the regulation unit can regulate the switching regulator output voltage to its maximum value again after the light source pulses are switched off, which corresponds to the initial state. The time constant of the RC element for discharging the storage capacitor should assume such a value that the switching regulator output voltage only increases by a small value in the pulse pauses. Preferably, the switching regulator output voltage increases by less than 0.1 V in a pulse pause. The increase of the switching regulator output voltage leads to an increased voltage drop across the voltage-controllable member, which as a result leads to a higher power dissipation in the voltage-controllable member. It is not necessary to select a time constant for the discharging which guarantees an equal increase of the switching regulator output voltage under all operating conditions (time durations for pulse phase and pulse pause) in particular with very long pulse pauses. With longer pulse pauses and unchanged pulse phase, the duty ratio (=pulse phase/pulse period duration) is reduced. With unchanged light source current in the pulse phase and reduced duty ratio, the average power dissipation in the voltage-controllable member decreases. Therefore, only the value for the longest pulse pause must be ascertained at which the power dissipation due to increased voltage drop across the voltage-controllable member does not become greater than the power dissipation at the same light source current value in the pulse phase and the shortest pulse pause (=greatest duty ratio). From this value for the longest pulse pause and the value to be defined for the increase of the switching regulator output voltage in the pulse pause there is determined the time constant of the discharge. As in the charging process, also in the discharging process the switching regulator proportionality factor must be included in the calculation.

In a preferred embodiment, the following values are specified:

increase of the switching regulator output voltage in the pulse pause dUSRA2=0.1 V With a minimum voltage drop across the voltage-controllable member of 1.5 V (without increase), the power dissipation in the voltage-controllable member increases with the same factor as the voltage increase: (0.1 V+1.5 V)/1.5 V=1.07 switching regulator proportionality factor KS=5.5 reduction of the storage capacitor voltage dUSK2=dUSRA2/KS=0.0182 V longest pulse pause TPause=0.125 s rate of change of the storage capacitor voltage dUSK2/dt=dUSK2/TPause=0.146 V/s maximum storage capacitor voltage USKmax=2.6 V time constant of the RC element τ (discharge)=USKmax/dUSK2/dt=18 s When in another embodiment the time constant of the charging is to be enlarged (for reducing the rate of change of the storage capacitor voltage), then the time constant of the discharging must be enlarged by the same factor in order to avoid a further increase of the power dissipation in the voltage-controllable member.

In a preferred embodiment, the regulation unit has a comparison unit that makes available at its output a reference voltage in dependence on the voltage drop across the voltage-controllable member. Preferably, the reference voltage is a binary voltage, which enables a particularly simple implementation of the following regulating voltage setting unit. The comparison unit can be configured as a comparator. The output of the comparison unit is connected to an input of a regulating voltage setting unit of the regulation unit. Such a modular construction enables a more flexible configuration of the regulation unit. The regulating voltage setting unit regulates the regulating voltage in dependence on the reference voltage. The output of the regulating voltage setting unit is connected to the regulation input of the switching regulator in order to make available the regulating voltage.

In a preferred embodiment, the regulating voltage is increased by the regulating voltage setting unit when the (binary) reference voltage has a first state, and the regulating voltage is decreased by the regulating voltage setting unit when the reference voltage has a second state different from the first state. The amount of the reference voltage is to be considered in the steady-state operation of the light source driver circuit, i.e. when an adjustment phase (=start-up phase) of the switching regulator and of the regulation unit has ended.

In a preferred embodiment, the comparison unit comprises a comparator, the first input of which is connected to the first terminal of the voltage-controllable member, and a direct voltage source. The first terminal of the direct voltage source is connected to the second input of the comparator, and the second terminal of the direct voltage source is connected as a second input of the regulation unit to the second terminal of the voltage-controllable member. The direct voltage source delivers a reference voltage level to the second input of the comparator, which is compared with the voltage level of the first input of the comparator. Depending on the comparison result, a reference voltage is made available at the output of the comparator. In this way, a light source driver circuit is created whose comparison unit compares the voltage drop of the voltage-controllable member with a reference direct voltage in order to generate the reference voltage. This design is particularly space-saving and has a low power consumption.

In a preferred embodiment, a diode is incorporated in the connection between the first terminal of the voltage-controllable member and the first input of the comparator, the anode of which diode is connected to the first input of the comparator, and the cathode of which diode is connected as a first input of the regulation unit to the first terminal of the voltage-controllable member. The diode has a blocking function to prevent current flow through the light source load during the pulse pause.

In a preferred embodiment, a first terminal of a storage capacitor of the comparison unit is connected to the anode of the diode, and a second terminal of the storage capacitor of the comparison unit is connected to the second input of the regulation unit. The storage capacitor of the comparison unit is different from the storage capacitor of the regulating voltage setting unit described above. In the case of an alternating pulse sequence, the storage capacitor effects an optimization of the regulating voltage for the highest occurring current intensity during the pulse phase. Here, at the highest current intensity there occurs the lowest voltage drop across the voltage-controllable member.

In a preferred embodiment, a voltage source with high internal resistance is arranged at the connection between the anode of the diode and the first input of the comparator. The voltage level of this voltage source is greater than the voltage level of the direct voltage source at the second input of the comparator. This causes in the start state of the circuit (see below) the reference voltage to be reliably set to "HIGH" level. In the start state this effects a minimum regulating voltage and thus a maximum output voltage of the switching regulator, so that with the first switching-on the intended current flows through the light source load. Also, when the light source load changes during operation of the light source driver, the voltage source enables an increase of the output voltage of the switching regulator.

Thus, when the current source is inactive (pulse pause of the pulse signal or second switching state), the storage capacitor of the comparison unit is charged to the voltage level of the voltage source at the first input of the comparator. Due to the greater voltage level at the first input, a first state of the reference voltage is made available at the output of the comparator. If the current source is then switched on by means of the pulse phase of the pulse signal and if a voltage across the voltage-controllable member drops which is smaller than the difference between the voltage amount at the first input of the comparator and the voltage amount of the forward voltage of the diode, the storage capacitor is discharged by the voltage-controllable member via the diode to a voltage value which corresponds to the sum of the voltage across the voltage-controllable member and the voltage amount of the forward voltage of the diode in the conducting direction. If this voltage level at the first input of the comparator achieved by the discharge process is greater than the voltage level at the second input of the comparator, the first state of the reference voltage first remains available at the output. This leads to the regulating voltage being changed, which leads to a change in the output voltage of the switching regulator. This change leads to a changed voltage drop across the voltage-controllable member and, as a result, to a switchover of the voltage level of the reference voltage at the comparator output.

In another preferred embodiment, the regulation unit is incorporated in a microcontroller and installed therein executable as a computer program product. Here, the voltage drop at the voltage-controllable member is digitized by means of AD conversion and made available to the microcontroller. This generates a corresponding regulating voltage according to the processes described here. This regulating voltage is turned into an analogue voltage signal by means of DA conversion and then fed to the switching regulator at the regulation input. This allows flexible reprogramming of the regulation parameters.

In another aspect of the invention, an optical measuring instrument is provided. This optical measuring instrument has at least one light source for illuminating an object to be measured. This light source, in particular an LED, is operated by means of a light source driver circuit of the type described above. Here, a pulse signal is employed for the current source to generate cyclic pulse currents with the current source, which then also flow through the light source load and cyclically switch the light source load on and off. This cyclic switching on/off of the light source load is used to illuminate an object to be measured mentioned above. The optical measuring instrument here is employed in particular for the recognition of machine-readable security features on value documents. The optical measuring instrument here can be part of a device for checking value documents.

In a further aspect of the invention, a device for checking value documents having a machine-readable security feature with a measuring region for receiving value documents as objects to be measured and an optical measuring instrument according to the preceding kind for illuminating the security feature is provided. The device according to the invention checks a large number of objects to be measured in the shortest possible time. Here, in particular transport speeds through the measuring region of several meters per second are provided. This means that only a very short amount of time of for example 0.02 s is available for checking an object to be measured that is then subjected to several light flashes. This requires short switch-on and switch-off times for the light source load, which are effected by means of the pulse signal. In a preferred embodiment, the device for checking value documents further has a detector, the detector capturing a response of the security feature in reaction to the illumination and converting it into an electronic output signal. Compared to a visual capture, this enables a more precise check of the security feature and thus improved forgery protection. In a preferred embodiment, the device for checking value documents further comprises a processor, the processor evaluating a property of the security feature (e.g. authenticity, document class) in dependence on the output signal of the detector and outputting the result of the evaluation. This enables the device to be integrated for checking in an industrial environment, e.g. in a bank note processing machine, as well as a more precise analysis of the security feature and thus improved forgery protection. Further preferably, a microprocessor (N1, 24) of the light source driver according to the invention is also the processor of the device for checking value documents.

In another aspect of the invention, there is provided a method for operating a light source load by means of a light source driver circuit according to the type previously described. Here, the switching of the pulse signal to the control terminal of the switching element is effected in order to connect the control terminal of a voltage-controllable member to a voltage source. In addition, there is effected a tapping of the voltage drop across the voltage-controllable member by means of the regulation unit. In addition, the regulating voltage is made available by means of the regulation unit, the regulating voltage being regulated in dependence on the voltage drop across the voltage-controllable member. In addition, there is effected a receiving of the regulating voltage in the switching regulator and outputting the output voltage to be regulated for operating the light source load using the regulating voltage to regulate a voltage level of the output voltage, the output voltage preferably diminishing linearly with the regulating voltage.

BRIEF DESCRIPTION OF THE DRAWINGS

Hereinafter the invention or further embodiments and advantages of the invention will be explained more closely on the basis of figures, the figures merely describing embodiment examples of the invention. Identical components in the figures are provided with identical reference signs. The figures are not to be considered true to scale, individual elements of the figures may be illustrated with exaggerated size or exaggerated simplicity.

DETAILED DESCRIPTION OF VARIOUS EMBODIMENTS

Figure 1:
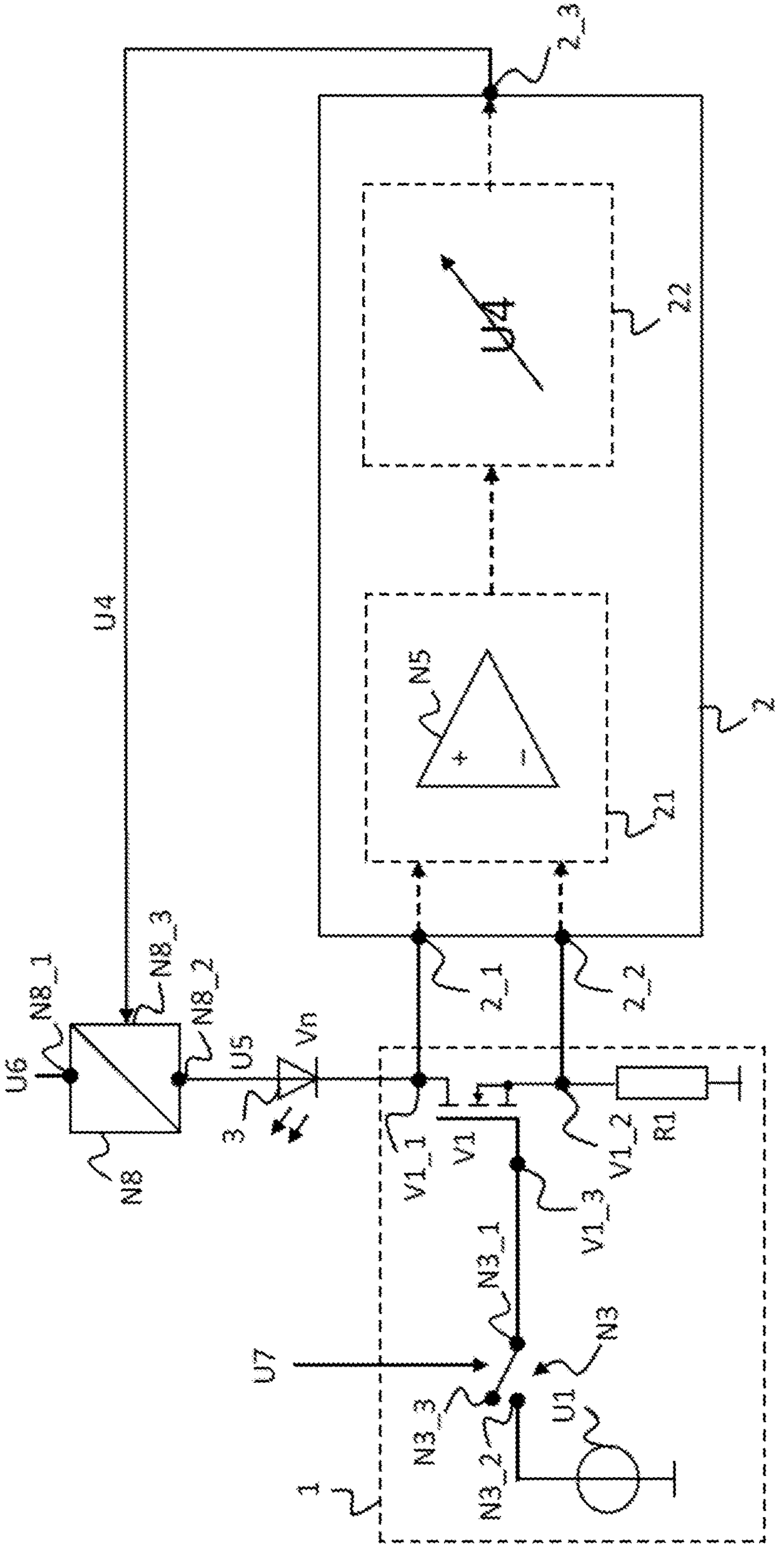
FIG. 1 shows a first embodiment example of a principle of a light source driver circuit according to the invention.

FIG. 1 shows a first embodiment example of a principle of a light source driver circuit according to the invention. A switching regulator N8 has a voltage input N8_1 for applying an input voltage U6. The switching regulator N8 has a voltage output N8_2 for outputting an output voltage U5 to be regulated. The switching regulator N8 has a regulation input N8_3 for applying a regulating voltage U4 for regulating the voltage amount of the output voltage U5.

The voltage output N8_2 is connected to a terminal of the light source load 3. The light source load 3 is shown here as an LED V3 by way of example. According to the invention, as a light source load 3 there is also provided the operation of a plurality of LEDs which are interconnected in series or in parallel. A parallel connection of several series connections of LEDs (LED branches) is also conceivable, or the use of other semiconductor light sources based on the same working principle. The anode of the light source load 3 is connected to the voltage output N8_2.

A current source 1 is provided in the light source driver circuit. The term "current source" is used throughout the description of the Figures regardless of a current direction at the output of the current source 1 (terminal V1_1 and V1_2 of a voltage-controllable member V1). The term "current source" can be exchanged with the term "current sink".

The current source 1 has a switching element N3 and a voltage-controllable member V1, illustrated here as a field effect transistor, FET, by way of example. A first terminal V1_1 of the FET is connected as a current output of the current source 1 to the cathode of the light source load 3. A second terminal V1_2 of the FET is connected to a first terminal of the current measuring resistor R1 (shunt). A second terminal of the current measuring resistor R1 is connected to a reference potential.

A control terminal V1_3 of the FET is connected to a first terminal N3_1 of the switching element N3. A second terminal N3_2 of the switching element N3 is connected to a first terminal of a voltage source N2. A second terminal of the voltage source N2 is connected to the reference potential. A pulse signal U7 is applied to a control terminal N3_3 of the switching element N3. This pulse signal U7, as a switching signal for the switching element N3, has a pulse phase by means of which the switching element N3 is switched into a first switching state (closed) and has a pulse pause by means of which the switching element N3 is switched into a second switching state (open). The switching element N3 is, for example, an electronic switching element, for example a transistor. In FIG. 1, the switching element N3 is shown in the second switching state (open), in which the control terminal V1_3 of the FET is not connected to the first terminal of the voltage source N2. In the first switching state (not illustrated) of the switching element N3, the control terminal V1_3 of the FET is connected to the first terminal of the voltage source.

The first terminal V1_1 of the FET V1 is connected to a first input 2_1 of a regulation unit 2. The second terminal V1_2 of the FET V1 is connected to a second input 2_2 of the regulation unit 2. This allows a voltage drop across the FET V1 to be tapped by the regulation unit 2. An output 2_3 of the regulation unit 2 is connected to the regulation input N8_3 of the switching regulator N8 to make available the regulating voltage U4, the regulating voltage U4 being regulated in dependence on a voltage drop at the FET V1.

The switching regulator N8, for example, is a standard DC-DC buck converter whose function does not need to be explained in detail. For example, the switching regulator N8 can be implemented with a combination of a TPS541540 integrated circuit of Texas Instruments and a resistor at the feedback input. This does not exclude the use of other integrated circuits.

Figure 3:
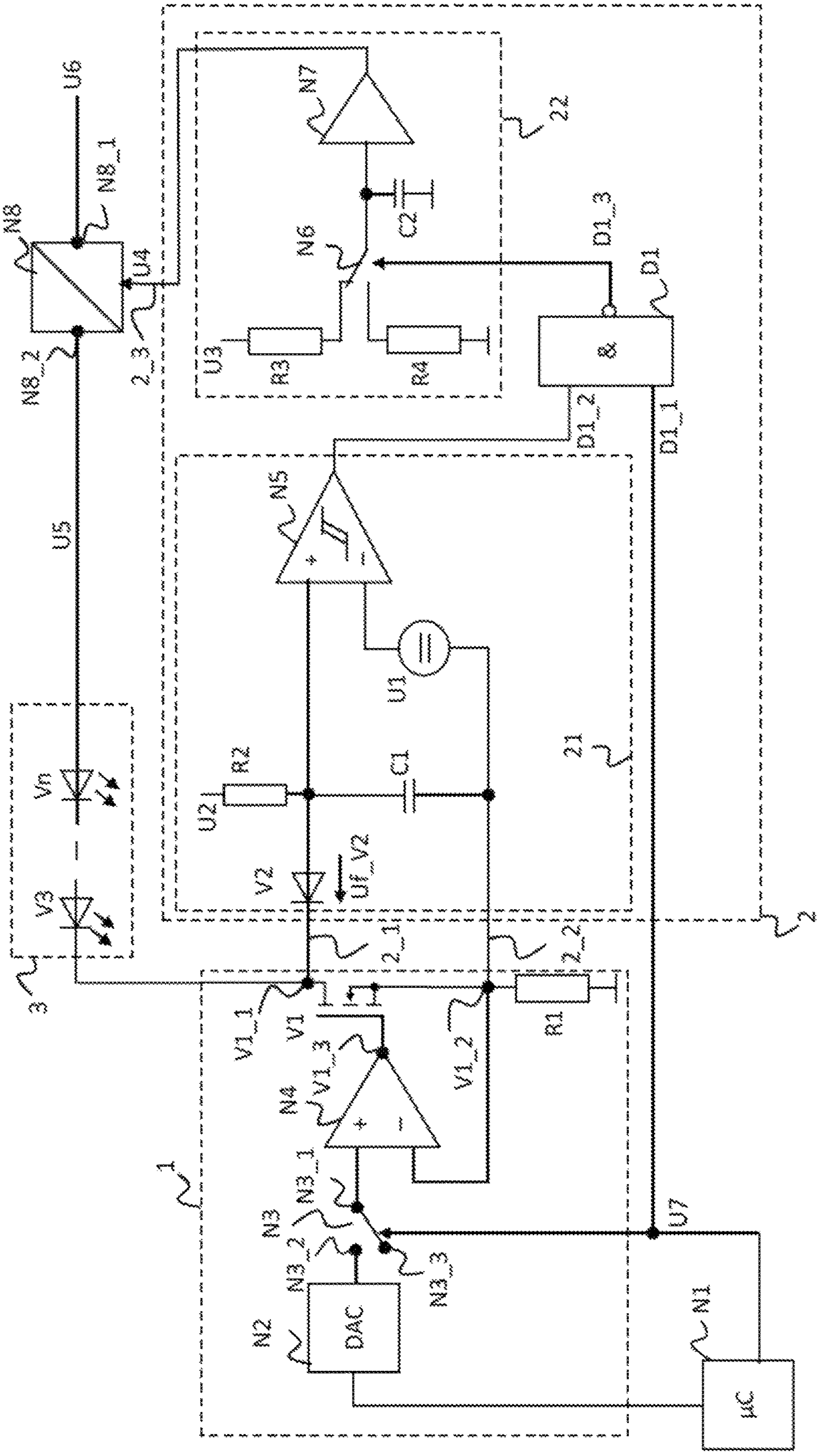
FIG. 3 shows a first embodiment example of a circuit for a light source driver circuit according to the invention based on the principle of FIG. 1.

FIG. 1 indicates a comparison unit 21 and a regulating voltage setting unit 22 of the regulation unit 2, which are described in more detail in FIG. 3.

Hereinafter, the principle of the light source driver circuit shown in FIG. 1 is explained.

The switchable current source 1 can be switched on and off by means of the pulse signal U7. The output current level of the current source 1 is set via the voltage source N2. In this regard, any changes in the output current level must be synchronized with the pulse signal such that there arises a cyclically varying sequence of current pulses through the light source load.

The light source load V3 is supplied with the output voltage U5 from the highly efficient switching regulator N8. The input voltage U6 thereof is a supply voltage of, for example, 24 volts direct voltage. Other voltage amounts or voltage types for the input voltage U6 are not excluded here, thus an alternating voltage could also be applied to the switching regulator N8, which is then rectified.

In order for the current source 1 to operate with a high efficiency, the voltage drop between the first terminal V1_1 and the second terminal V1_2 of the voltage-controllable member V1 should be as low as possible during the first switching state (closed). If the voltage-controllable member V1 is a FET, the voltage drop between the terminals V1_1 and V1_2 is referred to as the drain-source voltage UDS, and the voltage drop between the inputs V1_3 and V1_2 is referred to as the gate-source voltage UGS. A FET has a threshold voltage Vth of for example 1.8 V, which is characterized by the fact that for UGS>Vth a usable drain current, in particular a current through the light source load, flows. The drain-source voltage preferably fulfils the condition UDS>UGS−Vth so that the drain current, in particular the current through the light source load, is as independent of UDS as possible.

The switching regulator N8 is connected with the regulation input N8_3 to the output 2_3 of the regulation unit 2. Preferably, the output voltage U5 of the switching regulator N8 decreases linearly with an increase in the regulating voltage U4. Another dependency between U4 and U5 may also exist. The values of U4 and U5 can be a bijective mapping. Thus, the voltage level of the output voltage U5 can be set by means of the voltage level of the regulating voltage U4.

The amount of the regulating voltage U4 is regulated by the regulation unit 2.

In the first switching state of the switching element N3—current source 1 switched on—a voltage drop across the FET V1 is tapped and the regulating voltage U4 is regulated accordingly.

In the second switching state of the switching element N3—current source 1 switched off—the regulating voltage U4 is not regulated.

During the operation of the light source driver circuit (second and third operating phase, see below), a pulse signal U7 is applied to the switching element N3 to periodically (cyclically) switch the current source 1 on and off. It follows that the light source load 3 is switched on or off corresponding to the pulse signal U7. This, for example, generates light flashes that are radiated onto an object to be measured, for example a bank note, in order to obtain and evaluate a characteristic response to it. This enables, for example, an authenticity check of machine-readable features on an object to be measured by a bank note verification system.

An increased power dissipation of the FET during a second operating phase, the "adjustment phase" (see explanations for FIGS. 6 to 14), of the light source driver circuit must be taken into account for the selection of the members and the thermal design of the circuit board.

Figure 2:
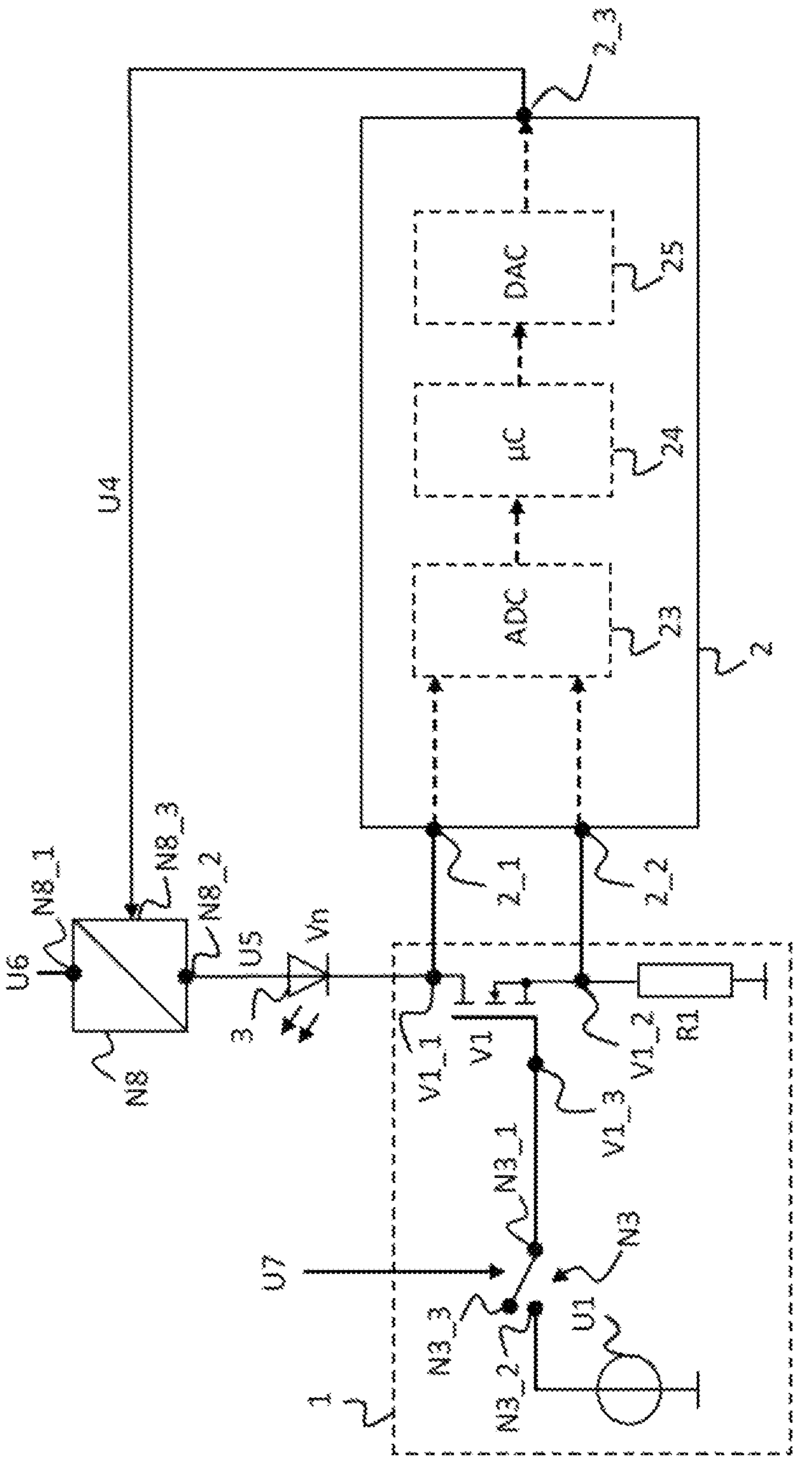
FIG. 2 shows a second embodiment example of a principle of a light source driver circuit according to the invention.

FIG. 2 shows a second embodiment example of a principle of a light source driver circuit according to the invention. The principle of the light source driver circuit of FIG. 2 corresponds to the principle of the light source driver circuit of FIG. 1, so that the description of FIG. 1 can be referred to in full. In the following, only the differences between FIG. 1 and FIG. 2 are explained. In contrast to FIG. 1, in FIG. 2 the regulation unit 2 is not configured having a comparison unit 21 and a regulating voltage setting unit 22, but alternatively with an AD converter 23, a microcontroller 24 and a DA converter 25. This difference will be explained in detail in FIG. 4. In the microcontroller 24, capturing the voltage difference at the FET based on a voltage value converted from analogue to digital across the first terminal V1_1 and the second terminal V1_2, and setting a digital regulating voltage corresponding to the digital voltage drop is effected. In the following DA converter, the set digital regulating voltage is converted into an analogue regulating voltage, which is then fed to the switching regulator N8 as regulating voltage U4.

FIG. 3 shows a first embodiment example of a circuit of a light source driver circuit according to the invention based on the principle of FIG. 1. The description of FIG. 1 also applies to FIG. 3, so that the description of FIG. 1 can be referred to in full. In the following, hence only the differences between FIG. 1 and FIG. 3 are explained.

In contrast to FIG. 1, the current source 1 of FIG. 3 is a precision current source that additionally contains a digital-to-analogue converter N2 and an operational amplifier N4.

As in FIG. 1, the current source 1 also comprises the switching element N3 and the voltage-controllable member V1, illustrated here as a field effect transistor, FET. The first terminal V1_1 of the FET is connected as a current output of the current source 1 to the cathode of the light source load 3. The light source load is illustrated here as a series connection of LEDs V3 to Vn. Since in FIG. 3 the load current flows from the cathode of the light source load to the terminal V1_1 of the current source 1, the term "current sink" is more appropriate from a purely circuit-theoretical point of view.

In an embodiment variant not shown in FIG. 3, a first terminal V1_1 of the voltage-controllable member V1 is connected to the output N8_2 of the switching regulator N8 and a second terminal V1_2 of the voltage-controllable member V1 is connected to the anode of the light source load 3, for example the anode of the first LED Vn of all the series-connected LEDs V3 to Vn, and the cathode of the LED V3 is connected to the first terminal of the current measuring resistor R1.

In another embodiment variant not shown in FIG. 3, a first terminal V1_1 of the voltage-controllable member V1 is connected to the output N8_2 of the switching regulator N8, a second terminal V1_2 of the voltage-controllable member V1 is connected to a first terminal of the current measuring resistor R1, and a second terminal of the current measuring resistor R1 is connected to the anode of the light source load 3, for example the anode of the first LED Vn of all the series-connected LEDs V3 to Vn. The cathode of the LED V3 is connected to the reference potential.

The configuration of these embodiment variants is easily possible for a person skilled in the art of light source drivers. Since in these embodiment variants the output current of the current source 1 flows from the terminal V1_2 to the light source load, the term "current source" is more appropriate from a purely circuit-theoretical point of view.

Since in all embodiment variants the topology of the "current source" 1 is the same and only the current direction of the output current toward the light source load 3 changes, the term "current source" is used generally here.

The second terminal V1_2 of the FET V1 is connected to the first terminal of the current measuring resistor R1 (shunt). The second terminal of the current measuring resistor R1 is connected to the reference potential.

The control terminal V1_3 of the FET V1 is connected to an output of an operational amplifier N4. The positive input of the operational amplifier N4 is connected to the first terminal N3_1 of the switching element N3. The negative input of the operational amplifier N4 is connected to the first terminal of the current measuring resistor R1.

The second terminal N3_2 of the switching element N3 is connected to an output of the voltage source N2, here provided as a DA converter. An input of the DA converter is connected to a microcontroller N1. Alternatively (not shown), the second terminal N3_2 of the switching element N3 is connected to an analogue output of the microcontroller N1, in which case the DA converter then is an integral part of the microcontroller N1.

The pulse signal U7 is applied to the control terminal N3_3 of the switching element N3. The pulse signal U7 is generated by the microcontroller N1. This pulse signal U7 has a pulse phase by means of which the switching element N3 is switched into a first switching state (closed), and a pulse pause by means of which the switching element N3 is switched into a second switching state (open). The switching element N3 is, for example, an electronic switching element, for example a transistor. In FIG. 3 the switching element N3 is shown in the second switching state (open), in which the first input (positive input) of the operational amplifier N4 is not connected to the output of the DA converter N2. In a preferred embodiment (not illustrated), in the second switching state of the switching element N3, the first input of the operational amplifier N4 is connected to the reference potential, so that possibly present charges flow out of the operational amplifier. This means that the reference potential is also present at the output of the operational amplifier, so that it is ensured that no current flows through the light source load.

In the (not illustrated) first switching state (closed) of the switching element N3, the first input (positive input) of the operational amplifier N4 is connected to the output of the DA converter N2.

As in FIG. 1, also in FIG. 3 the first terminal V1_1 of the FET is connected to the first input 2_1 of the regulation unit 2. The second terminal V1_2 of the FET is connected to the second input 2_2 of the regulation unit 2. This allows a voltage drop UDS across the FET to be tapped by the regulation unit 2. The output 2_3 of the regulation unit 2 is connected to the regulation input N8_3 of the switching regulator N8 to make available the regulating voltage U4, the regulating voltage U4 being regulated in dependence on the voltage drop at the FET V1.

The regulation unit 2 of FIG. 3 comprises a comparison unit 21, a regulating voltage setting unit 22 and a NAND gate D1. Instead of a NAND gate D1, another digital gate could also be used to temporally couple the pulse signal U7 and the output signal of the comparison unit 21.

The comparator unit 21 comprises a comparator N5 whose first input (positive input) is connected to an anode of a diode V2. The cathode of the diode V2 is connected to the first terminal V1_1 of the FET and represents the first input 2_1 of the regulation unit 2. The anode of the diode V2 furthermore is connected to a first terminal of a resistor R2. A second terminal of the resistor R2 is connected to a voltage source U2. The anode of the diode V2 furthermore is connected to a first terminal of a storage capacitor C1.

A second terminal of the storage capacitor C1 is connected to the second terminal V1_2 of the FET and represents the second input 2_2 of the regulation unit 2. The second terminal of the storage capacitor C1 is connected to a second terminal of a direct voltage source U1. A first terminal of the direct voltage source U1 is connected to a second input (negative input) of the comparator N5.

The output of the comparator N5 is connected to a first input D1_1 of the NAND gate D1. A second input D1_2 of the NAND gate D1 is connected to the output of the microcontroller N1 which makes available the pulse signal U7. An output D1_3 of the NAND gate D1 is connected to a control input of a switching element N6 of the regulating voltage setting unit 22. The switching element N6 is, for example, an FET analogue switch.

A first input terminal of the switching element N6 is connected to a first terminal of a resistor R3 of the regulating voltage setting unit 22. A second terminal of the resistor R3 is connected to a voltage source U3 of the regulating voltage setting unit 22. A second input terminal of the switching element N6 is connected to a first terminal of a resistor R4 of the regulating voltage setting unit 22. A second terminal of the resistor R4 is connected to the reference potential.

An output terminal of the switching element N6 is connected to a first terminal of a storage capacitor C2 of the regulating voltage setting unit 22. A second terminal of the storage capacitor C2 is connected to the reference potential.

By applying a corresponding signal, the control terminal of the switching element N6 effects either the first terminal of the resistor R3 to be connected to the first terminal of the storage capacitor C2 or the first terminal of the resistor R4 to be connected to the first terminal of the storage capacitor C2.

The resistor R3 and the storage capacitor C2 form a first RC element. The resistor R4 and the storage capacitor C2 form a second RC element. The time constants of both RC elements are selected such that under all three operating conditions (start condition, adjustment phase, phase of adjusted state) the function of the light source driver circuit is ensured. In one proposal for the dimensioning—which does not limit the subject matter of the invention—the resistor R4 is much greater than the resistor R3, in particular R4 is at least 10 times greater than R3, for example the ratio R4/R3 is equal to 60. This ensures that the regulating voltage U4 changes only slightly during a pulse period duration.

The first terminal of the storage capacitor C2 of the regulating voltage setting unit 22 is connected to an input of an amplifier stage N7. An output of the amplifier stage N7 makes available the regulating voltage U4 and thus represents the output 2_3 of the regulation unit 2. In a preferred embodiment, the amplifier stage N7 has an amplification of +1. This results in a particularly simple circuit design with few electronic components.

Hereinafter, the principle of the light source driver circuit shown in FIG. 3 is explained.

The switchable current source 1 can be switched on and off by means of the pulse signal U7. The output current level of the current source is set via the voltage source N2, here an analogue output value of the DA converter or the microcontroller N1. In this regard, any changes in the output current level must be synchronized with the pulse signal such that there arises a cyclically varying sequence of current pulses through the light source load.

The light source load 3 is supplied with the output voltage U5 from the highly efficient switching regulator N8. The input voltage U6 thereof is a supply voltage of for example 24V direct voltage.

In order for the current source 1 to operate with a high efficiency, the voltage drop between the first terminal V1_1 and the second terminal V1_2 of the voltage-controllable member must be as low as possible during the first switching state (closed). For example, the voltage drop is approx. 1.5 volts. In an adjusted state of the light source driver circuit of FIG. 3, the voltage between the first terminal V1_1 and the second terminal V1_2 of the voltage-controllable member is set by the comparison unit 21, in particular by the voltage level of the direct voltage source U1.

The switching regulator N8 with the regulation input N8_3 is connected to the output 2_3 of the regulation unit 2 and thus also to the output of the amplifier stage N7 of the regulating voltage setting unit 22. The output voltage U5 of the switching regulator N8 decreases for example linearly when the regulating voltage U4 is increased. Thus, the voltage level of the output voltage U5 can be set by means of the voltage level of the regulating voltage U4. The amount of the regulating voltage U4 is regulated by the regulation unit 2.

For example, the pulse signal U7 is binary and has a logical "LOW" level to switch the switching element N3 into a second switching state and a logical "HIGH" level to switch the switching element N3 into a first switching state. The specific voltage amounts of the two levels are not relevant to the invention, nor is the assignment of the levels to the switching states of the switching element N3 relevant to the invention.

Figure 4:
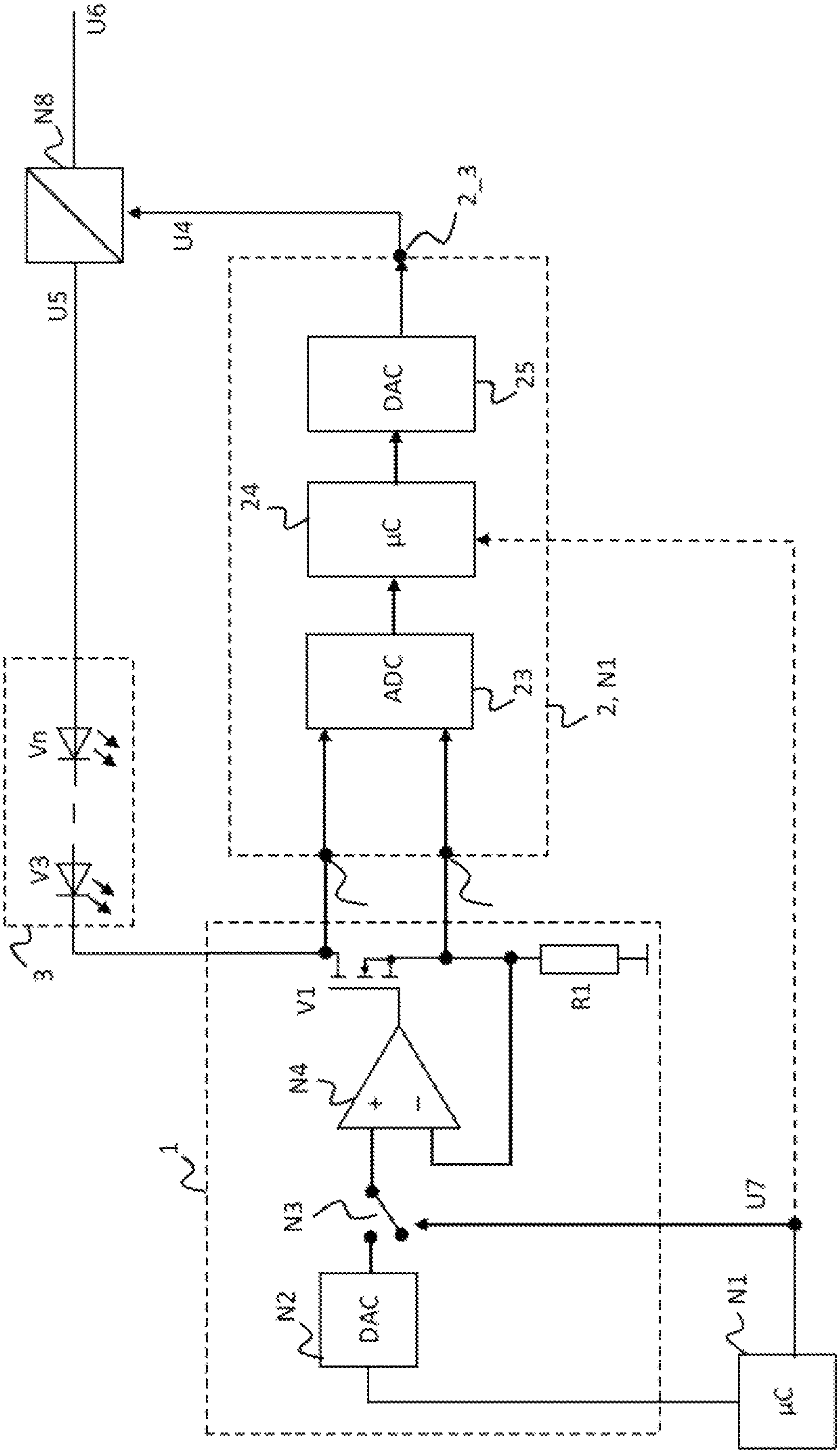
FIG. 4 shows a second embodiment example of a circuit for a light source driver circuit according to the invention based on the principle of FIG. 2.

FIG. 4 shows a second embodiment example of a light source driver circuit according to the invention based on the principle of FIG. 2. Only the differences to FIG. 3 are pointed out to avoid unnecessary repetition. Instead of the analogue circuit elements according to FIG. 3, in FIG. 4 the regulation loop is configured to be at least partially digital, the voltage drop being turned into a digital value by means of an AD converter 23, which value can be evaluated by a microcontroller 24. The microcontroller 24 then maps the comparison unit 21 and the regulating voltage setting unit 22 shown in FIGS. 1 and 3, respectively, to regulate a digital regulating voltage. The digital regulating voltage generated in this way is turned into an analogue regulating voltage U4 by means of DA converter 25 and is made available to the switching regulator N8 at the regulation input 2_3. The regulation unit 2 here can be completely configured in the form of a computer program product. Preferably, the microcontroller N1 is also the microcontroller 24 for regulating the regulating voltage U4. In one embodiment variant, the DA converter 25 and/or the AD converter 23 is part of the microcontroller 24. This enables a reduced number of members and lower energy consumption.

All light source driver circuits of FIG. 1 to FIG. 4 of the present invention have three temporal operating phases. The first operating phase is called the "start condition", the second operating phase is called the "adjustment phase", the third operating phase is called the "phase of adjusted state", for further details reference is made to FIGS. 6 to 14. In the following, the principle of the light source driver circuit of the invention is explained in more detail on the basis of the specific embodiment according to FIGS. 6 to 14.

In the "start condition" phase, the respective input voltages and supply voltages are applied to the corresponding components of the light source driver circuit. In the case of a light source driver circuit according to FIG. 3, in this first phase the input voltage U6 is applied to the switching regulator N8, the voltage U1 to the second input of the comparator N5, the voltage U2 to the resistor R2 and the voltage U3 to the resistor R3. The operating voltages required to supply the operational amplifier N4, the comparator N5, the amplifier N7, the microcontroller N1 and the DAC N2 are also applied. In this first phase, the regulating voltage U4 in each light source driver circuit has an unregulated value, for example a voltage value of 0V, and the pulse signal U7 has a constant "LOW" level, whereby a permanent second switching state of the switching element N3 is switched, and thus the current source 1 is permanently deactivated in this first phase. With reference to FIG. 3, the storage capacitor C1 of the comparison unit 21 is charged to the voltage level of the voltage source U2. The voltage level of the voltage source U2 is greater than the voltage level of the direct voltage source U1 at the negative input of the comparator N5. The (permanent) logical "LOW" level of the pulse signal U7 at the second input D1_2 of the NAND gate D1 moreover keeps the output D1_3 of the NAND gate D1 at a logical "HIGH" level. The logical "HIGH" level of the output D1_3 of the NAND gate D1 is applied to the control terminal of the switching element N6, here an electronic changeover switch, and switches the switching element N6 into a state not shown in FIG. 3, in which the first terminal of the resistor R4 is connected to the first terminal of the storage capacitor C2 of the regulating voltage setting unit 22. As a result, the storage capacitor C2 is discharged or kept in the discharged state, and the regulating voltage U4 decreases or remains at a minimum value. If a minimum value of the regulating voltage U4 is zero volts for example, then the output voltage U5 is regulated by the switching regulator N8 to its maximum value of typically 19 V direct voltage.

When the pulse signal U7 changes its logical state from logical "LOW" to logical "HIGH" for the first time, a second operating phase begins, the "adjustment phase" of the light source driver circuit of FIGS. 1 to 4. Here, by means of the pulse signal U7 the first switching state of the switching element N3—current source 1 switched on—is switched. According to FIG. 3, the voltage drop UDS at the FET is then greater than a difference between the voltage amount of the direct voltage U1 and a forward voltage Uf_V2 of the diode V2 in the flow direction. The comparator N5 of FIG. 3 thus first continues to carry a logical "HIGH" level at its output. The "HIGH" level of the comparator N5 and the "HIGH" level of the pulse signal U7 switch the NAND gate D1 at the output to logical "LOW". This switchover of the output of the NAND gate D1 is made available to the control terminal of the switching element N6, whereupon the switching element N6 switches over (to the switching state illustrated in FIG. 3). Thus, the first terminal of the resistor R3 is connected to the first terminal of the capacitor C2, thereby charging the storage capacitor C2 via the resistor R3. As the voltage at the storage capacitor C2 increases, the regulating voltage U4 also increases.

If at the same time there is present a sufficient average current of, for example, at least 60 mA through the light source load, the output voltage U5 drops by means of the switching regulator N8 due to the negative proportionality constant between the regulating voltage U4 and the output voltage U5 in the light source driver circuit according to FIGS. 1 to 4. The pulse sequence of the voltage U7 and the input signal into the DAC N2 shall be selected such that there is present sufficient average current through the light source load. With a dropping output voltage U5, the drain-source voltage UDS of the FET decreases (UDS is the voltage drop between the first terminal V1_1 and the second terminal V1_2 of the FET V1). With reference to FIG. 3 there applies: When the voltage drop UDS is smaller than the difference between the voltage amount of the direct voltage U1 and a forward voltage Uf_V2 of the diode V2 in the flow direction, the output of the comparator N5 changes (flips) the reference voltage from a first state (logical "HIGH" level) to a second state (logical "LOW" level). This flip switches the NAND gate D1 at the output D1_3 over to logical "HIGH", whereupon the switching element N6 switches over and connects the first terminal of the resistor R4 to the first terminal of the storage capacitor C2. This partially discharges the storage capacitor C2 again and decreases the regulating voltage U4.

Both in the "adjustment phase" and in the "phase of adjusted state" of the light source driver circuit of FIGS. 1 to 4, a pulse signal U7 is applied to the switching element N3 in order to periodically (cyclically) switch the current source 1 on and off. It follows that the light source load 3 is switched on or off corresponding to the pulse signal. This, for example, generates light flashes that are radiated onto an object to be measured in order to obtain and evaluate a characteristic response to it. This enables, for example, an authenticity check of machine-readable features on objects to be measured.

In one pulse period duration of each pulse (=pulse phase and pulse pause) in FIG. 3, the storage capacitor C2 of the regulating voltage setting unit 22 is slightly charged and also slightly discharged. An average voltage across the storage capacitor C2 sets a stable voltage value of the regulating voltage U4 and thus of the output voltage U5 of the switching regulator N8. This stable voltage value of the output voltage U5 operates the current source 1 at the optimal operating point of a current-voltage characteristic curve of the FET. Here, the voltage value of the direct voltage source U1 specifies the drain-source voltage UDS of the FET in the pulse phase of the "phase of adjusted state".

The second operating phase, the "adjustment phase", ends when the mean value of the regulating voltage U4 no longer increases monotonically over a longer time period, for example of 10 pulse period durations, in particular of more than 5 ms, but U4 only alternates between two values within this time period. With the end of the "adjustment phase", the "phase of adjusted state" begins—the actual operating phase of the light source driver circuit.

By means of the regulation unit 2 of the light source driver circuit of FIGS. 1 to 4, a stable output voltage value of the output voltage U5 is obtained, which corrects nominally different light source forward voltages and fluctuations of the light source forward voltages during operation of the light source driver circuit due to aging or circuit-internal or circuit-external temperature fluctuations (heating/cooling) as well as voltage fluctuations of the switching regulator N8. Increased power dissipation at the voltage-controllable member V1 during the "adjustment phase" of the light source driver circuit must be taken into account when selecting members and in the thermal design of the circuit board.

Figure 5:
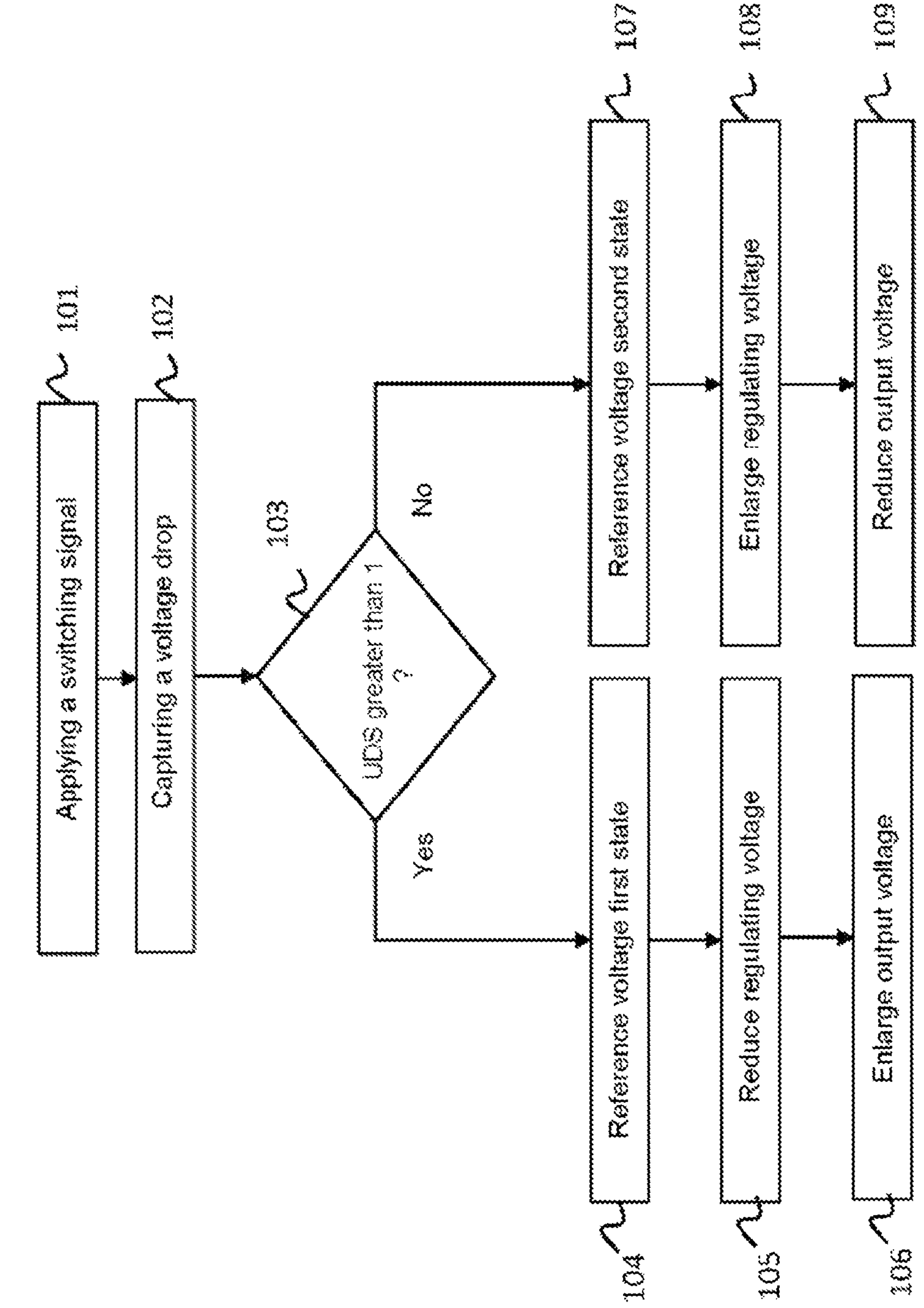
FIG. 5 shows a first embodiment example of a flowchart of a method according to the invention for operating a light source load.

FIG. 5 shows a first embodiment example of a flowchart of a method 100 according to the invention for operating a light source load by means of a light source driver circuit according to the type described above.

In a first step 101, a pulse signal is applied to a switching element to connect a control terminal of a voltage-controllable member to a voltage source in a pulse phase and not to connect it in a pulse pause. In the following step 102, a voltage drop across the voltage-controllable member is tapped by means of a regulation unit. In step 103, by means of a comparison unit in the regulation unit it is compared whether the voltage drop UDS is greater than the difference between the voltage amount of the direct voltage U1 and a forward voltage Uf_V2 of the diode V2 in the flow direction.

If yes in step 103, a reference voltage is switched into a first state (step 104). Subsequently, in a step 105, a regulating voltage is regulated (increased in this case) by means of the regulation unit 2, the regulating voltage being regulated in dependence on the voltage drop at the voltage-controllable member. In a following step 106, the regulating voltage is received in the switching regulator and an output voltage of the switching regulator is reduced and output to operate the light source load, the output voltage preferably diminishing linearly as the regulating voltage is enlarged. Reducing the output voltage leads to a reduction of the voltage drop UDS.

If no in step 103, a reference voltage is switched into a second state (step 107). Subsequently, in a step 108, a regulating voltage U4 is regulated (reduced in this case) by means of the regulation unit 2, the regulating voltage being regulated in dependence on the voltage drop at the voltage-controllable member. In a following step 109, the regulating voltage is received in the switching regulator and an output voltage of the switching regulator is enlarged and output to operate the light source load, the output voltage preferably increasing linearly as the regulating voltage is reduced. Enlarging the output voltage leads to an enlarging of the voltage drop UDS.

The method of the flowchart of FIG. 5 can be employed as a working method (operating method) in any of the light source driver circuits illustrated in FIG. 1 to FIG. 4. In the analogous embodiments according to FIG. 1 and FIG. 3, all method steps run in parallel.

Figure 6:
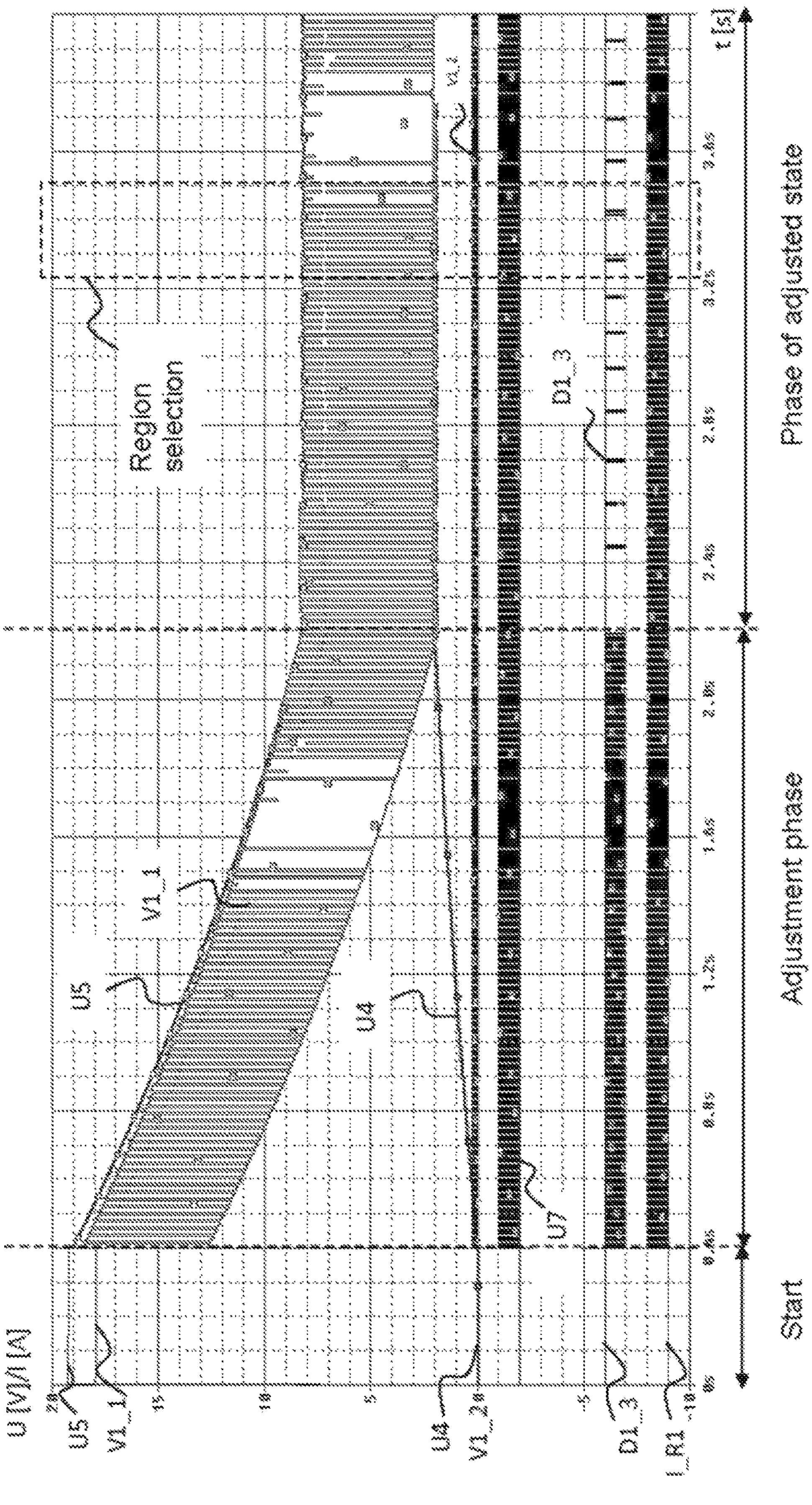
FIG. 6 shows a first voltage/current-time course of selected signals in the light source driver circuit according to FIG. 3.

FIG. 6 shows a first voltage/current-time course of selected signals of the light source driver circuit illustrated in FIGS. 1 to 4, in particular FIG. 3. FIG. 6 here shows a voltage course of the switching regulator's N8 output voltage U5 to be regulated in a time period of 0 seconds to 4 seconds, a voltage course at the first terminal V1_1 of the FET V1 in a time period of 0 seconds to 4 seconds, a voltage course at the second terminal V1_2 of the FET V1 in a time period of 0 seconds to 4 seconds, a voltage course of the regulating voltage U4 in a time period of 0 seconds to 4 seconds, a voltage course of the pulse signal U7 in a time period of 0 seconds to 4 seconds, a voltage course at the output D1_3 of the digital gate D1 in a time period of 0 seconds to 4 seconds and a current course of the current through the current resistor R1 in a time period of 0 seconds to 4 seconds.

The voltage-time course in FIG. 6 is divided into the three operating phases. The time period of 0 seconds to 0.4 seconds shows the start conditions, as already mentioned above with: U5 at 19 volts, U4 at 0 volts, U7 at a permanent "LOW" level. Thus, current source 1 is deactivated in this operating phase, which is illustrated by the current value of 0 A of the current I_R1 through the current measuring resistor R1. The current I_R1 corresponds to the current through the light source load 3 and is therefore hereinafter also referred to as the light source current. According to FIG. 3, the "LOW" level of the pulse signal U7 leads to a "HIGH" level at the output D1_3 of the NAND gate D1.

In this time period of the "start condition", through the regulating voltage U4 of 0 V, due to the dependence between the voltages U4 and U5 (e.g. negative linear), a switching regulator's N8 output voltage U5 to be regulated of a maximum amount of 19 volts is outputted by the switching regulator N8. Thus, a voltage drop between the first terminal V1_1 and the second terminal V1_2 of the voltage-controllable member V1 (FET) is at a maximum and in this first phase for example 18 volts. (The voltage courses were obtained by a simulation. Due to limitations of the simulation program, for the voltage drop there arises the value which is 1 V smaller. In the implemented circuit, the voltage drop is also 19 V.) Since in the start condition the maximum drain-source voltage UDS is present, a sufficient light source current can already be made available with the first pulse (start of the adjustment phase), regardless of the selected light source load.

Figure 8:
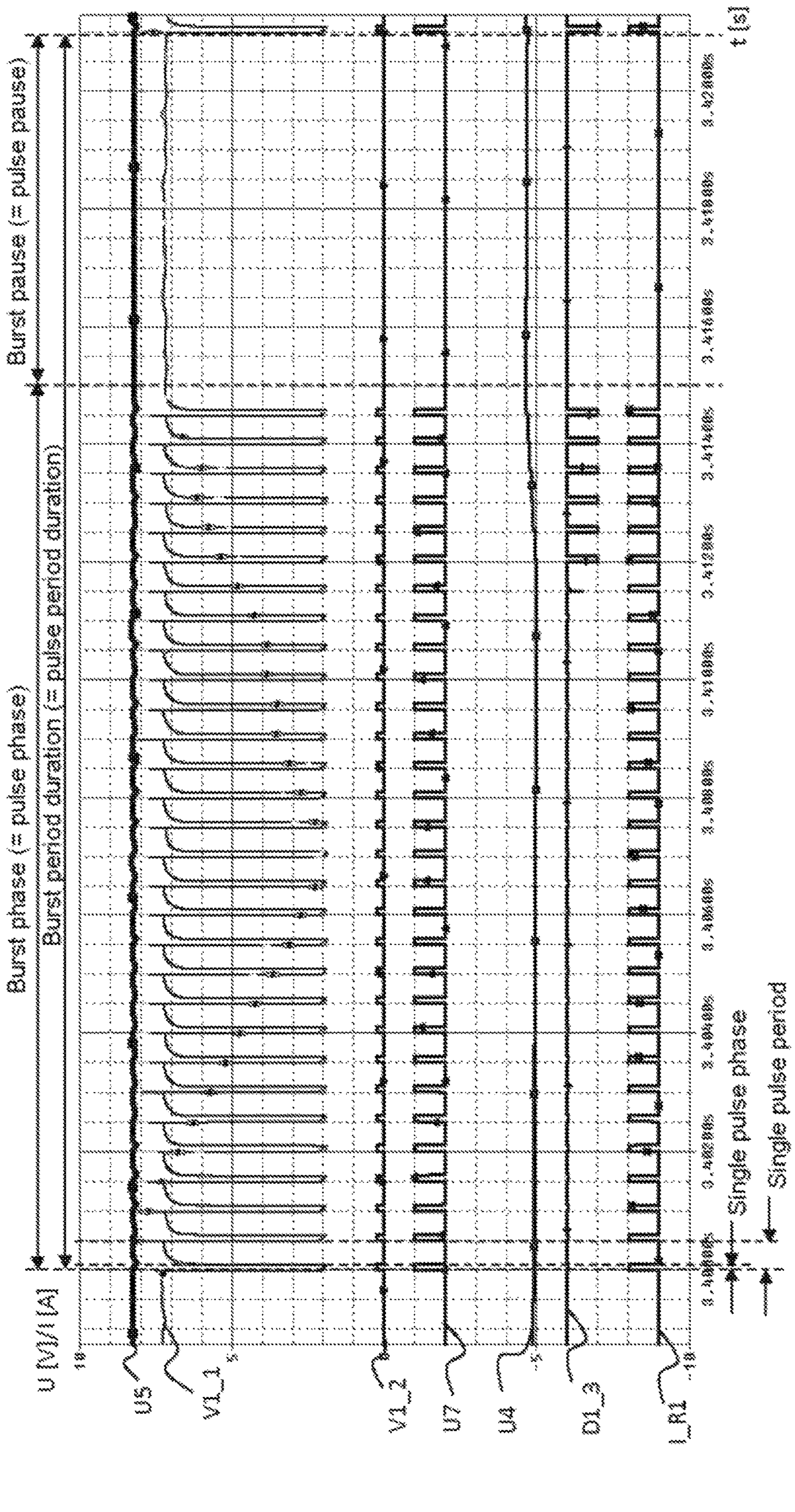
FIG. 8 shows a selected partial region of the voltage/current-time course shown in FIG. 7.

The second operating phase, the "adjustment phase", begins from the first switchover of the pulse signal U7 from logical "LOW" to logical "HIGH" at 0.4 seconds. In this case, the current source 1 is activated in pulse phases of the pulse signal U7, whereby a light source current I_R1 of 1 ampere is set, for example. Other current values are also possible. The pulse signal U7 can, for example, be a burst signal and have a predefined number of single pulses, also referred to as a burst. An example pulse signal is illustrated in FIG. 8. The invention is not limited to burst pulse signals according to FIG. 8.

The second operating phase, the "adjustment phase", ends at 2.2 seconds, which can be seen by the end of a rise in the regulation voltage U4, and which is illustrated in FIG. 6 in particular by a constant average voltage UDS (difference between the voltages at the terminals V1_1 and V1_2 of the FET). In addition, in the "phase of adjusted state" the output D1_3 of the NAND gate D1 switches over with a lower frequentness.

Figure 7:
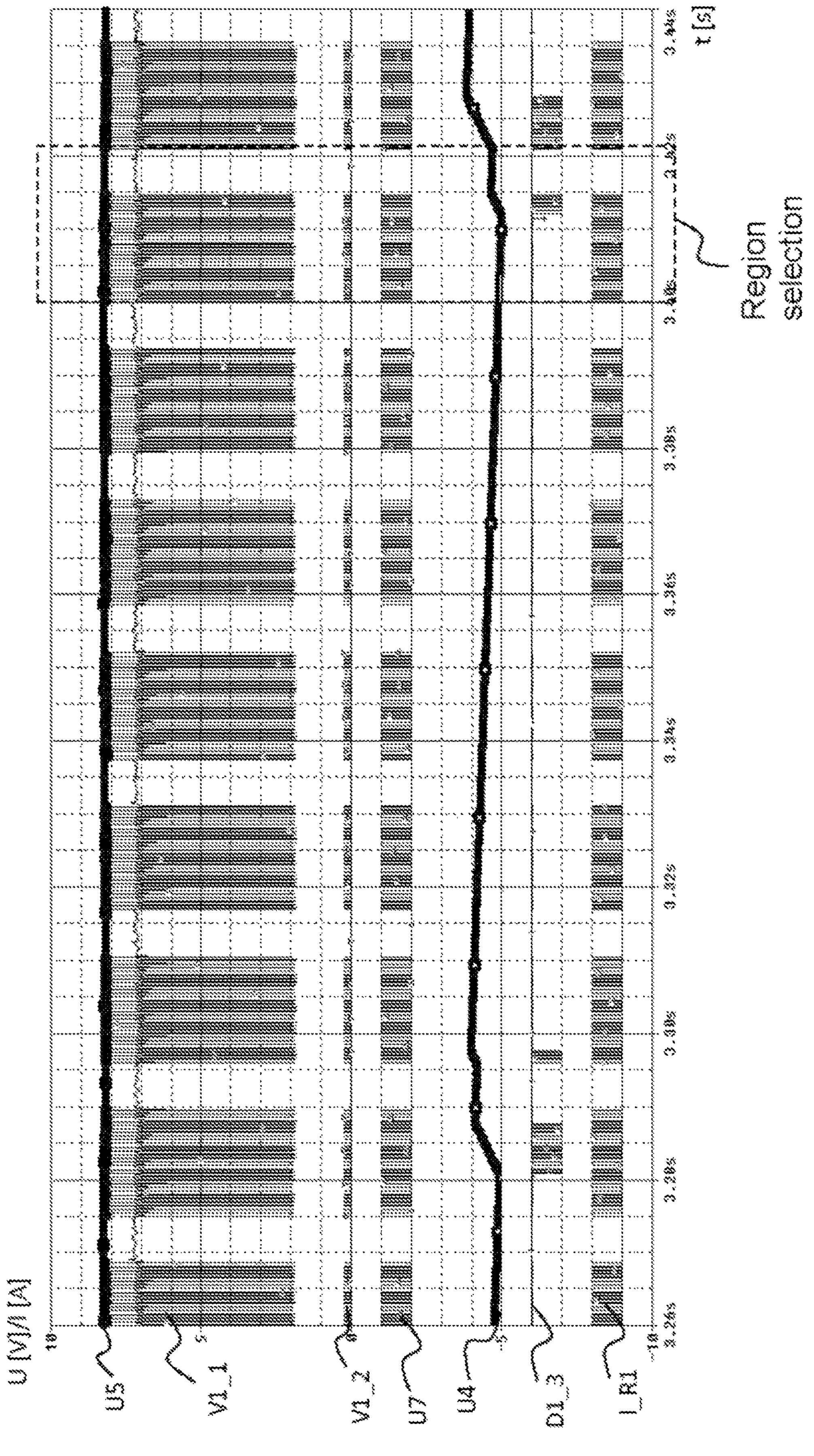
FIG. 7 shows a selected partial region of the voltage/current-time course shown in FIG. 6.

FIG. 7 shows a selected partial region (=herein also region selection) of the voltage/current time course shown in FIG. 6 between 3.26 seconds and 3.44 seconds, see also marking "region selection" in FIG. 6. FIG. 7 represents the voltage-time courses and the current-time courses in the third operating phase "phase of adjusted state". Here, the voltage scale for U4 is enlarged by a factor of 100 and shifted into the scale region shown. In this illustration, a slight increase and decrease of the regulating voltage U4 due to the charging and discharging of the storage capacitor C2 according to FIG. 6—caused by the switchover of the output D1_3 of the NAND gate D1—is clearly illustrated. Thus, in a time period between 3.3 seconds and 3.41 seconds—i.e. a time period of approximately 5 bursts—the regulating voltage U4 is continuously reduced slightly, since the output D1_3 of the NAND gate D1 is constantly kept at the logical "HIGH" level despite the pulse signal U7. The first terminal of the resistor R4 is therefore connected to the first terminal of the capacitor C2. The resulting time constant of the second RC element (formed by R4 and C2) is substantially larger than the burst phase of the pulse signal U7. The repeated presence of a "LOW" level at the output D1_3 of the NAND gate D1 in the time periods from 3.28 seconds to 3.3 seconds as well as from 3.41 seconds to 3.43 seconds leads to a switchover of the switching element N6 so that the first terminal of the resistor R3 is connected to the capacitor C2. This leads to a charging of the storage capacitor C2 and thus to an increase of the regulating voltage U4. As a result, U4 fluctuates with low amplitude around an adjusted value.

FIG. 8 shows a selected partial region of the voltage/current time course shown in FIG. 7 between 3.4 seconds and 3.42 seconds, see also marking "region selection" in FIG. 7. Like FIG. 7, FIG. 8 thus shows the voltage-time courses or the current-time course in the third operating phase "phase of adjusted state". Again, the voltage scale for U4 is enlarged by a factor of 100 and shifted to the illustrated scale region. In this illustration an exemplary pulse signal U7 is illustrated whose burst period duration is 21 milliseconds. The burst phase of this burst period duration has 30 single pulses, each having a single pulse phase of 100 microseconds and a single pulse period duration of 500 microseconds. The resulting single pulse pause is therefore 400 microseconds. This sequence of 30 single pulses is called a "burst", which is repeated at intervals of one burst pause.

FIG. 8 shows the interrelation between the pulse signal U7, the voltage drop UDS resulting therefrom (difference between the voltage of the first terminal V1_1 and the voltage of the second terminal V1_2) and the current I_R1 through the current measuring resistor R1. It can be seen that the last six single pulses of the burst shown (time period between 3.412 and 3.415 seconds) cause the output D1_3 of the NAND gate D1 to flip, thus leading to an increase in the regulating voltage U4.

Figure 9:
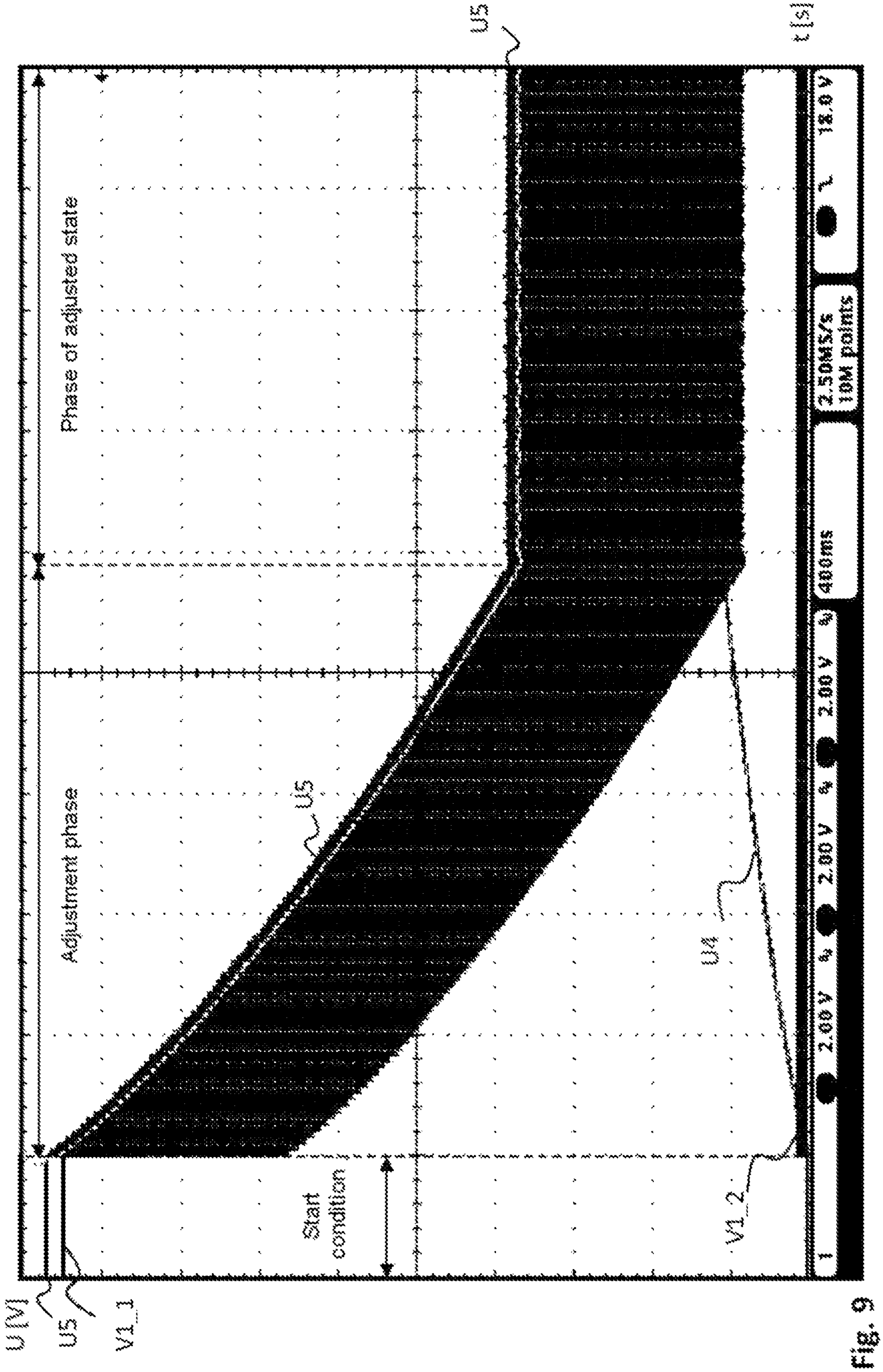
FIG. 9 shows a second voltage-time course of signals in the light source driver circuit according to FIG. 3.

FIG. 9 shows a second voltage-time course of selected signals of the light source driver circuit shown in FIGS. 1 to 4, in particular FIG. 3. FIG. 9 shows a voltage course of the switching regulator's N8 output voltage U5 to be regulated in a time period of 0 seconds to 4 seconds, a voltage course at the first terminal V1_1 of the FET in a time period of 0 seconds to 4 seconds, a voltage course at the second terminal V1_2 of the FET in a time period of 0 seconds to 4 seconds and a voltage course of the regulating voltage U4 in a time period of 0 seconds to 4 seconds.

The voltage-time course in FIG. 9 is also divided into the three operating phases. The time period of 0 seconds to 0.4 seconds shows the start conditions, as already mentioned above with: U5 at 19 volts, U4 at 0 volts, U7 at a permanent "LOW" level (not shown). This deactivates the power source 1 in this time period.

In this "start condition" time period, through the regulating voltage U4 in the amount of 0 V, due to the dependence between the voltages U4 and U5 (e.g. inversely proportional), a switching regulator's N8 output voltage U5 to be regulated of a maximum amount of 19 volts is outputted by the switching regulator N8. Thus, a voltage drop between the first terminal V1_1 and the second terminal V1_2 of the voltage-controllable member V1 (FET) is at its maximum and also 19 volts in this first phase. (For better recognizability, the curve of the voltage U5 is shifted upwards by 0.4 V)

The second operating phase "adjustment phase" begins with the first switchover of the pulse signal U7 from logical "LOW" to logical "HIGH". This activates the current source 1 in the pulse phases. The pulse signal U7 can, for example, have a burst signal with a predefined number of single pulses, also referred to as a burst. Such a pulse signal is shown in FIGS. 10 to 14.

With such operating conditions the second operating phase ends at 2.3 seconds, which can be seen by the end of an increase in the regulating voltage U4, and which is illustrated in FIG. 9 in particular by a constant mean voltage UDS (difference from the voltages at the terminals V1_1 and V1_2).

Figure 10:
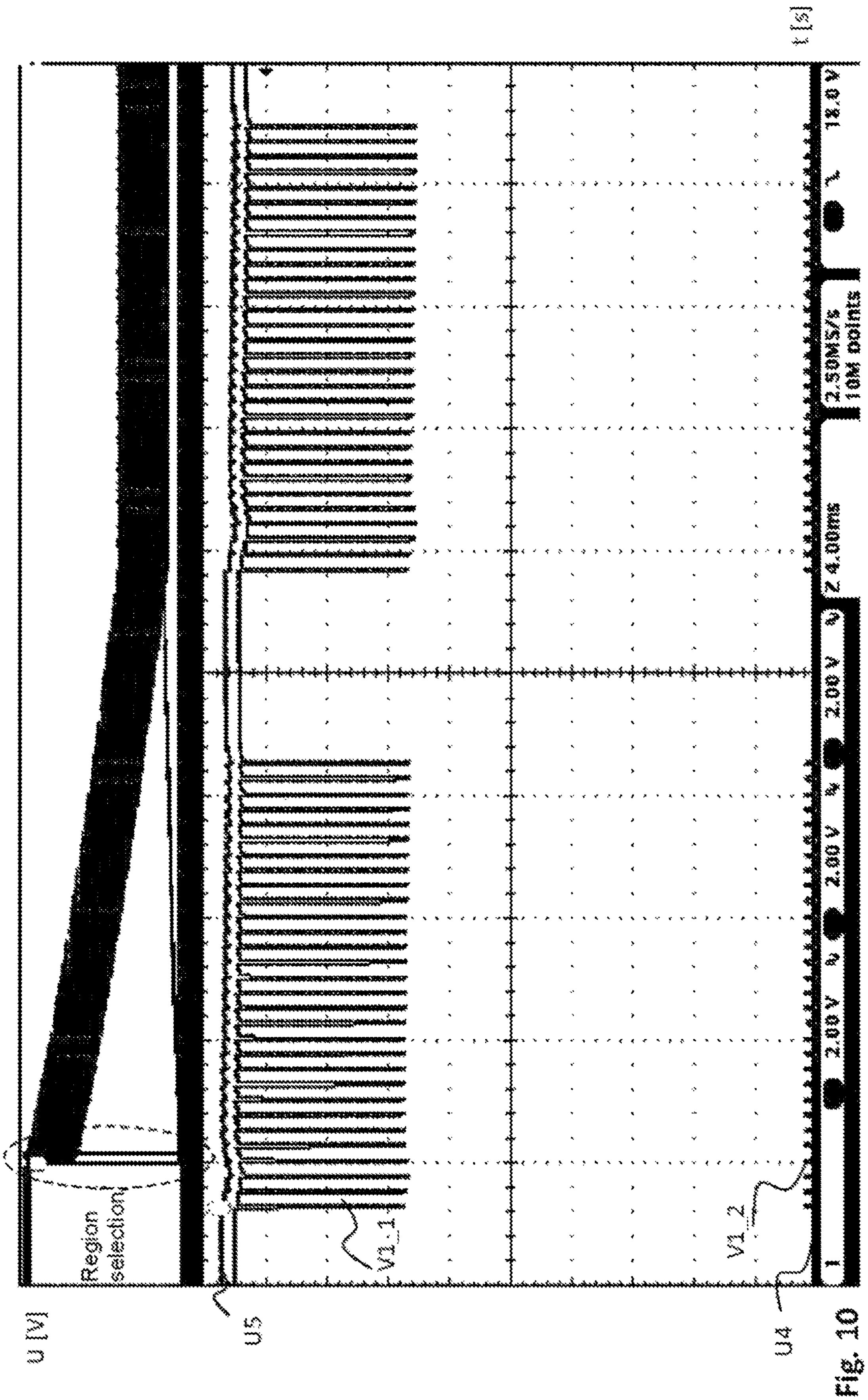
FIG. 10 shows a first partial region of the voltage-time course shown in FIG. 9.

FIG. 10 shows a first partial region of the voltage-time course shown in FIG. 9. The location of the partial region is indicated in the upper illustration of FIG. 10. The partial region illustrated in FIG. 10 is selected at the beginning of the second operating phase, the "adjustment phase". A large voltage drop UDS (difference between the voltages at terminals V1_1 and V1_2) can be recognized, which corresponds to a high power dissipation during the pulse phase. The voltage value V1_2 has a constant amplitude even in the first pulses, so that the desired light source current is already present in the first pulses.

Figure 11:
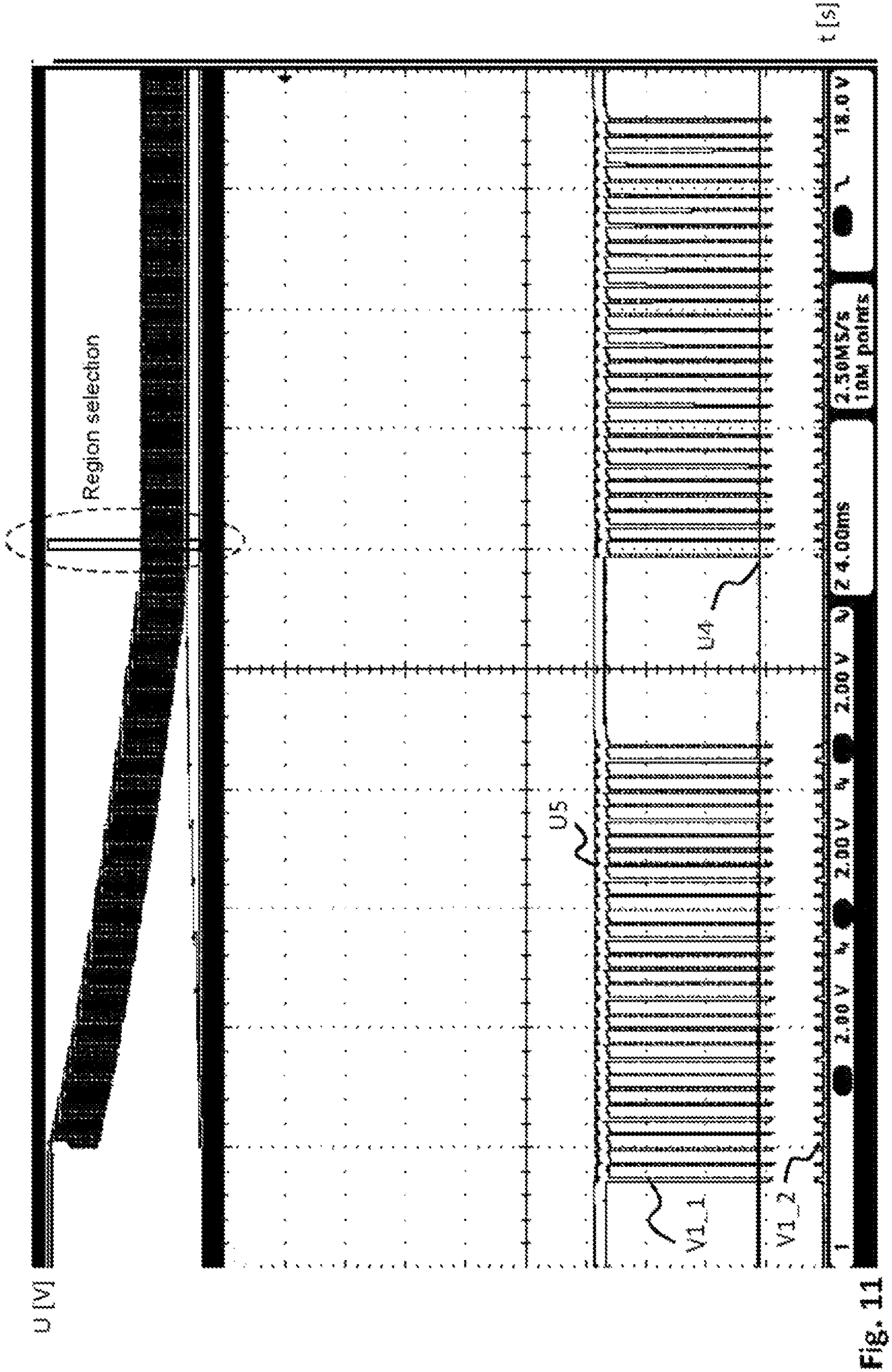
FIG. 11 shows a second partial region of the voltage-time course shown in FIG. 9.

FIG. 11 shows a second partial region of the voltage-time course shown in FIG. 9. The location of the second partial region is indicated in the upper illustration of FIG. 11. The partial region shown in FIG. 10 is selected at the beginning of the third operating phase, the "phase of adjusted state".

Figure 12:
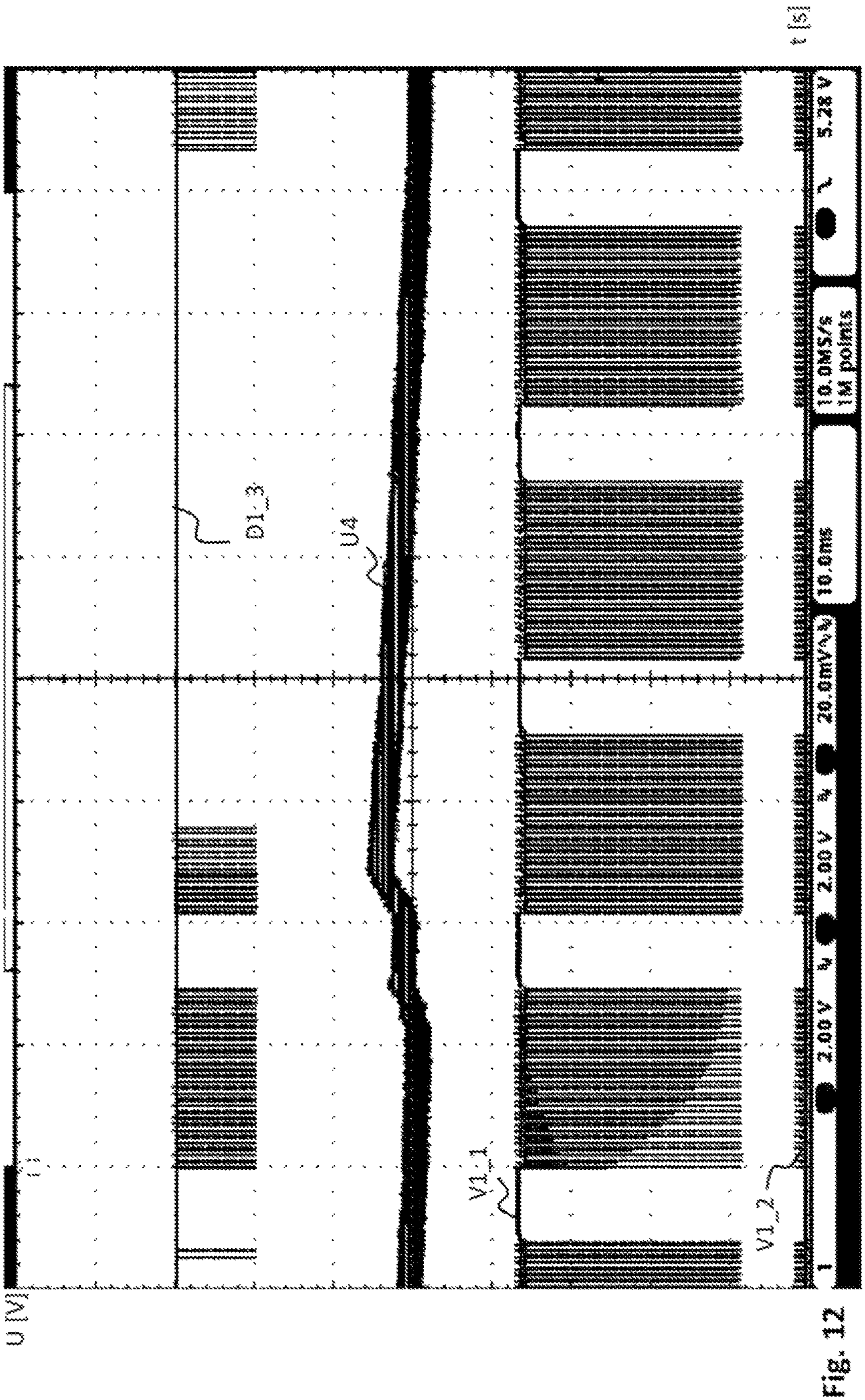
FIG. 12 shows a partial region of the voltage-time course shown in FIG. 9.

FIG. 12 shows an exemplary partial region from the third operating phase "phase of adjusted state" of the voltage-time course shown in FIG. 9. Instead of the voltage course of the switching regulator's N8 output voltage U5 to be regulated, a voltage course at the output D1_3 of the digital gate D1 is shown. For this Figure, U4 was measured via AC coupling, so that only the deviation from the mean value is illustrated. Similar to FIG. 7, the change in voltage U4 due to the temporary charging and discharging of the storage capacitor C2 is shown here. Reference is made to the explanations regarding FIG. 8.

Figure 13:
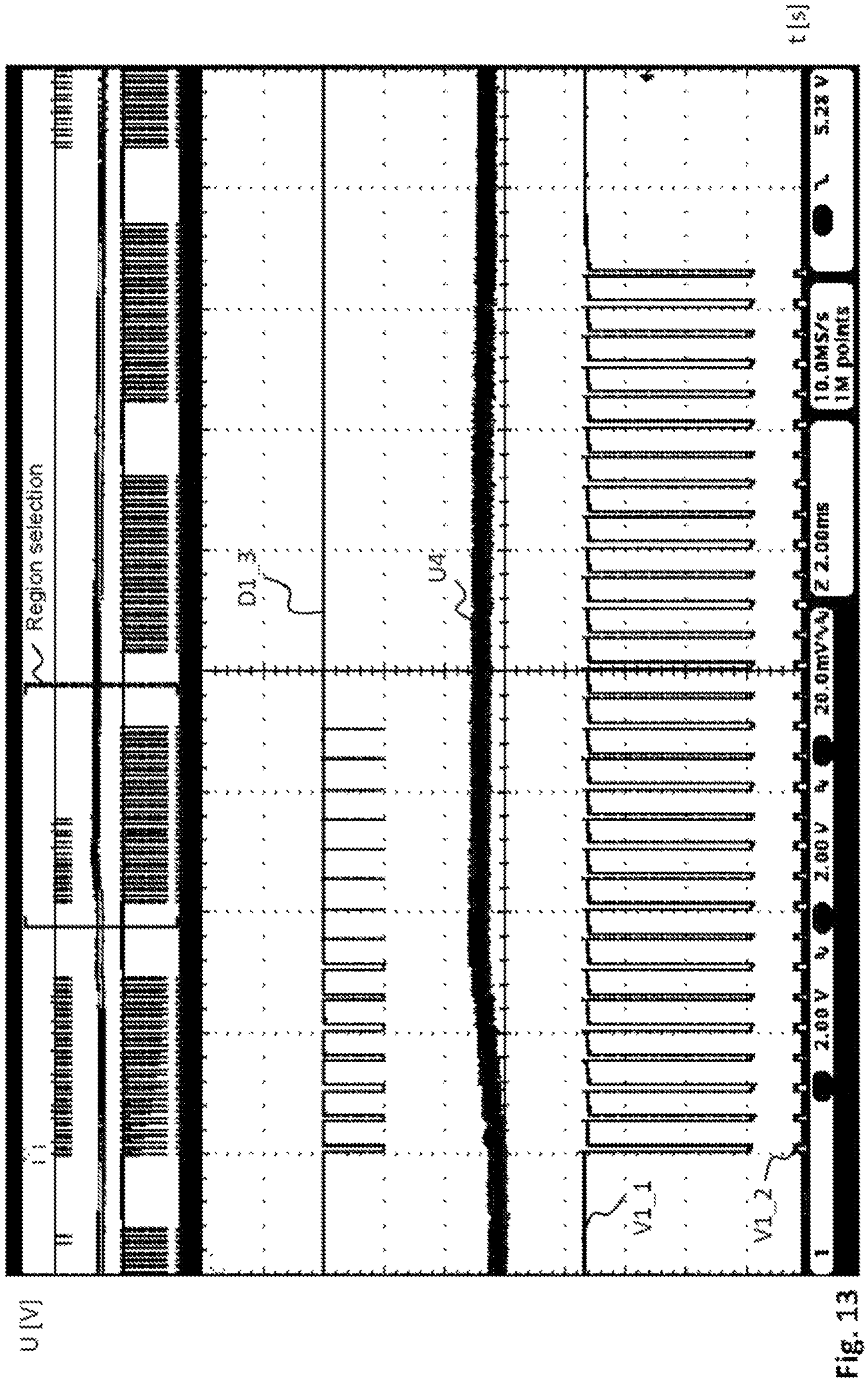
FIG. 13 shows a partial region of the voltage-time course shown in FIG. 12.

FIG. 13 shows a partial region of the voltage-time course shown in FIG. 12. The location of the partial region is indicated in the upper illustration of FIG. 13. Similar to FIG. 8, an exemplary pulse signal, represented by V1_1 and V1_2, is presented here in a time-stretched illustration. For this Figure, U4 was measured via AC coupling, so that only the deviation from the mean value is illustrated. The shown last 8 logical "LOW" level pulses of the output D1_3 of the NAND gate D1 (of FIG. 3), with a length of approx. 4 microseconds, occur during a phase of the regulation process in which the voltage across C1 is almost identical to the direct voltage source U1. It can be seen that these eight last logical "LOW" level pulses of the output D1_3 of the NAND gate D1 do not lead to any relevant increase of the regulating voltage U4. The number of "LOW" level pulses of output D1_3 can vary due to the analogue regulation principle.

Figure 14:
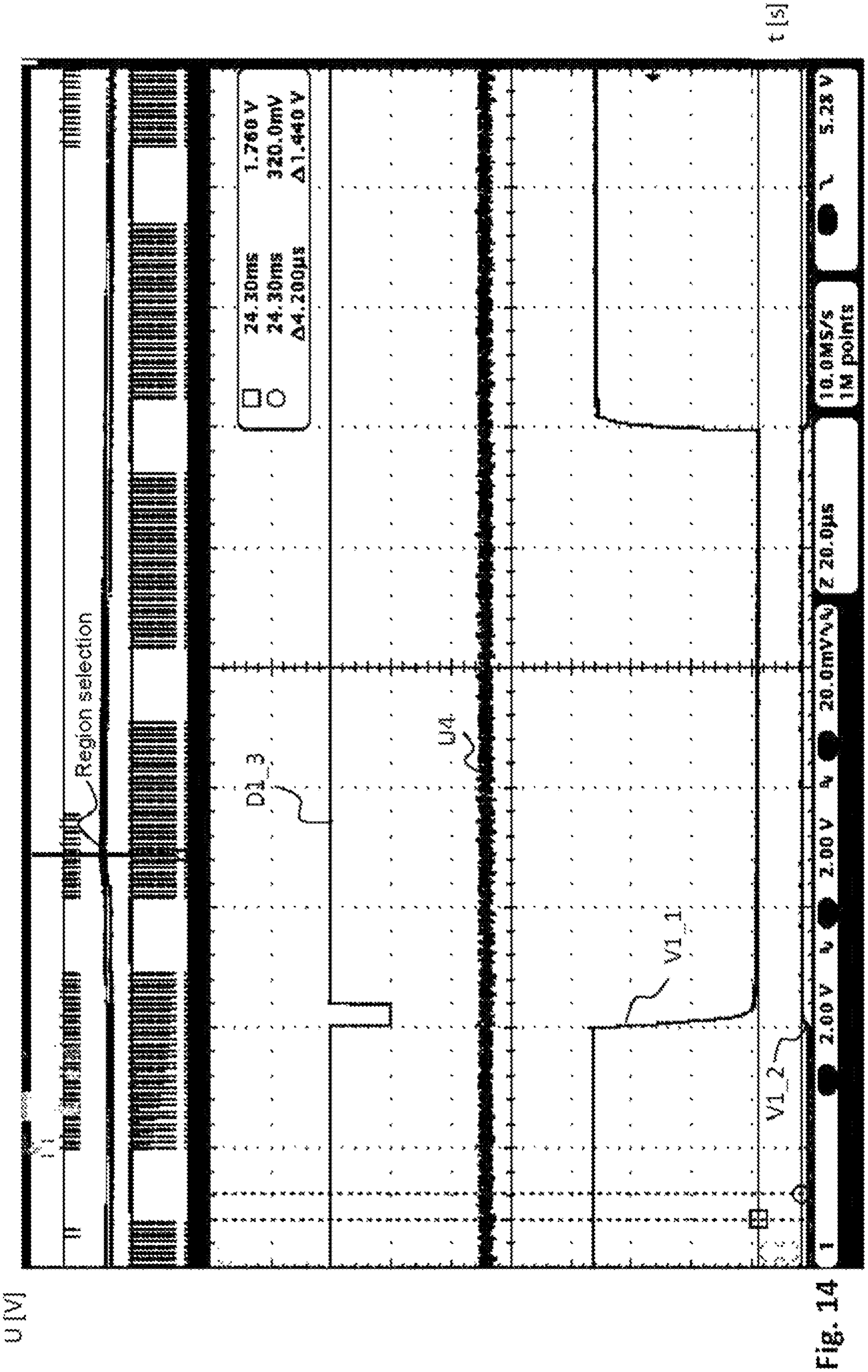
FIG. 14 shows a partial region of the voltage-time course shown in FIG. 12.

FIG. 14 shows a partial region of the voltage-time course shown in FIG. 12. The location of the partial region is indicated in the upper illustration of FIG. 14. It is shown that the voltage difference UDS at the FET is 1.44 volts (difference between V1_1 and V1_2). This corresponds to the difference between the voltage amount of 2 volts of the direct voltage source U1 and the forward voltage in the forward direction of the diode D2. This low voltage difference UDS effects a minimal power dissipation of the FET.

Within the scope of the invention, all elements described and/or drawn and/or claimed can be combined with each other in any way.

The invention claimed is:

1. A light source driver circuit comprising:

a switching regulator with a voltage input for applying an input voltage, a voltage output for outputting an output voltage to be regulated for operating a light source load and a regulation input for applying a regulating voltage for regulating a voltage amount of the output voltage;

a current source with a switching element and a voltage-controllable member arranged in series with the light source load, wherein a pulse signal is applied to a control terminal of the switching element, wherein in a pulse phase of the pulse signal the switching element is switched into a first switching state in which a control terminal of the voltage-controllable member is connected to a voltage source, and wherein in a pulse pause of the pulse signal the switching element is switched into a second switching state in which the control terminal of the voltage-controllable member is not connected to the voltage source; and a regulation unit whose first input is connected to a first terminal of the voltage-controllable member and whose second input is connected to a second terminal of the voltage-controllable member in order to tap a voltage drop between the first terminal and the second terminal of the voltage-controllable member, and whose output is connected to the regulation input of the switching regulator in order to make available the regulating voltage to the switching regulator, wherein the regulating voltage is regulated in dependence on a voltage drop between the terminals of the voltage-controllable member.

2. A light source driver circuit comprising:

a switching regulator with a voltage input for applying an input voltage, a voltage output for outputting an output voltage to be regulated for operating a light source load and a regulation input for applying a regulating voltage for regulating a voltage amount of the output voltage;

a current source with a switching element and a voltage-controllable member arranged in series with the light source load, wherein a pulse signal is applied to a control terminal of the switching element, wherein in a pulse phase of the pulse signal the switching element is switched into a first switching state in which a control terminal of the voltage-controllable member is connected to a voltage source, and wherein in a pulse pause of the pulse signal the switching element is switched into a second switching state in which the control terminal of the voltage-controllable member is not connected to the voltage source; and a regulation unit whose first input is connected to a first terminal of the voltage-controllable member and whose second input is connected to a second terminal of the voltage-controllable member, and whose output is connected to the regulation input of the switching regulator in order to make available the regulating voltage to the switching regulator, wherein the regulating voltage is regulated in dependence on a voltage drop between the terminals of the voltage-controllable member, wherein the regulation unit has a storage capacitor for increasing or decreasing the voltage amount of the regulating voltage in dependence on the voltage drop at the voltage-controllable member, thereby regulating the regulating voltage.

3. A light source driver circuit comprising:

a switching regulator with a voltage input for applying an input voltage, a voltage output for outputting an output voltage to be regulated for operating a light source load and a regulation input for applying a regulating voltage for regulating a voltage amount of the output voltage;

a current source with a switching element and a voltage-controllable member arranged in series with the light source load, wherein a pulse signal is applied to a control terminal of the switching element, wherein in a pulse phase of the pulse signal the switching element is switched into a first switching state in which a control terminal of the voltage-controllable member is connected to a voltage source, and wherein in a pulse pause of the pulse signal the switching element is switched into a second switching state in which the control terminal of the voltage-controllable member is not connected to the voltage source; and a regulation unit whose first input is connected to a first terminal of the voltage-controllable member and whose second input is connected to a second terminal of the voltage-controllable member, and whose output is connected to the regulation input of the switching regulator in order to make available the regulating voltage to the switching regulator, wherein the regulating voltage is regulated in dependence on a voltage drop between the terminals of the voltage-controllable member, wherein the regulation unit has a comparison unit which makes available at its output a reference voltage whose voltage amount depends on the voltage drop across the voltage-controllable member, wherein the output of the comparison unit is connected to an input of a regulating voltage setting unit of the regulation unit which regulates the voltage amount of the regulating voltage in dependence on the reference voltage, wherein the output of the regulating voltage setting unit is connected to the regulation input of the switching regulator in order to make available the regulating voltage.

4. The light source driver circuit of claim 3, wherein the regulating voltage is increased by the regulating voltage setting unit when the reference voltage has a first state, and wherein the regulating voltage is decreased by the regulating voltage setting unit when the reference voltage has a second state different from the first state.

5. The light source driver circuit according to claim 3, wherein the comparison unit comprises a comparator and a direct voltage source, wherein the first input of the comparator is connected to the first terminal of the voltage-controllable member and the second input of the comparator is connected to a first terminal of the direct voltage source and a second terminal of the direct voltage source is connected as a second input of the regulation unit to the second terminal of the voltage-controllable member.

6. The light source driver circuit according to claim 5, wherein a diode is incorporated in the connection between the first terminal of the voltage-controllable member and the first input of the comparator, an anode of which diode is connected to the first input of the comparator, and a cathode of which diode is connected as a first input of the regulation unit to the first terminal of the voltage-controllable member.

7. The light source driver circuit according to claim 6, wherein a first terminal of a storage capacitor of the comparison unit is connected to the anode of the diode, and a second terminal of the storage capacitor of the comparison unit is connected to the second input of the regulation unit.

8. The light source driver circuit according to claim 2, wherein the storage capacitor of the regulation unit is a part of a first RC element, wherein a time constant of the first RC element assumes such a value that the highest rate of change of the storage capacitor voltage is smaller than the quotient of the lowest rate of change of the switching regulator output voltage and the switching regulator proportionality factor.

9. The light source driver circuit according to claim 8, wherein the storage capacitor of the regulation unit is a part of a second RC element, wherein the time constant of the second RC element assumes such a value that the switching regulator output voltage increases only by a small value in the pulse pauses.

10. The light source driver circuit according to claim 9, wherein the first RC element or the second RC element is selected in dependence on the reference voltage by means of a switching element of the regulating voltage setting unit.

11. The light source driver circuit according to claim 1, wherein the regulation unit is incorporated in a microcontroller and installed therein executable as a computer program product.

12. An optical measuring instrument comprising at least one light source as a light source load for illuminating an object to be measured and a light source driver circuit according to claim 1 for operating the light source.

13. An arrangement with a light source driver circuit according to claim 1 and a light source load.

14. A device for checking value documents, in particular bank notes, having a machine-readable security element with an optical measuring instrument according to claim 12 for illuminating the security element.

15. A method for operating a light source load by means of a light source driver circuit according to claim 1, wherein the method comprises the following steps of:

switching the pulse signal to the control terminal of the switching element to connect the control terminal of the voltage-controllable member to the voltage source;

tapping the voltage drop between the terminals of the voltage-controllable member by means of the regulation unit;

regulating the regulating voltage by means of the regulation unit, wherein the regulating voltage is regulated in dependence on the voltage drop across the voltage-controllable member;

receiving the regulating voltage in the switching regulator and outputting the output voltage to be regulated for operating the light source load using the regulating voltage for regulating the voltage level of the output voltage, wherein the regulating voltage is inversely proportional to the output voltage.

* * * * *